US012072467B2

(12) United States Patent
Kanzaki

(10) Patent No.: US 12,072,467 B2
(45) Date of Patent: Aug. 27, 2024

(54) WIDE-ANGLE LENS

(71) Applicant: NIDEC SANKYO CORPORATION, Nagano (JP)

(72) Inventor: Yosuke Kanzaki, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 329 days.

(21) Appl. No.: 17/622,690

(22) PCT Filed: Jun. 24, 2020

(86) PCT No.: PCT/JP2020/024900
§ 371 (c)(1),
(2) Date: Dec. 23, 2021

(87) PCT Pub. No.: WO2020/262488
PCT Pub. Date: Dec. 30, 2020

(65) Prior Publication Data
US 2022/0260812 A1    Aug. 18, 2022

(30) Foreign Application Priority Data

Jun. 24, 2019  (JP) .................................. 2019-116153

(51) Int. Cl.
*G02B 13/06*       (2006.01)
*G02B 9/08*        (2006.01)
(Continued)

(52) U.S. Cl.
CPC ............... *G02B 13/06* (2013.01); *G02B 9/08* (2013.01); *G02B 9/10* (2013.01); *G02B 13/003* (2013.01); *G02B 13/006* (2013.01)

(58) Field of Classification Search
CPC ... G02B 9/08; G02B 9/10; G02B 9/60; G02B 13/003; G02B 13/0045; G02B 13/006; G02B 13/06
See application file for complete search history.

(56) References Cited

U.S. PATENT DOCUMENTS

2007/0053075 A1    3/2007  Kamo
2016/0077313 A1    3/2016  Komiyama

FOREIGN PATENT DOCUMENTS

CN      103576290       2/2014
JP      2007071979      3/2007
(Continued)

OTHER PUBLICATIONS

"International Search Report (Form PCT/ISA/210) of PCT/JP2020/024900," mailed on Sep. 24, 2020, with English translation thereof, pp. 1-4.
(Continued)

*Primary Examiner* — Jack Dinh
(74) *Attorney, Agent, or Firm* — JCIPRNET

(57) ABSTRACT

The present invention provides a wide-angle lens capable of obtaining a suitable negative power even when a thickness of a first lens is increased in order to increase strength against impact. The wide-angle lens 100 has a front group 110, an aperture 80, and a rear group 120. Assuming that a central thickness in an optical axis direction of a first lens 10 is T1 (mm) and a focal length of the entire lens system is f0 (mm), the following conditional expression:

$$1.500 \leq T1/f0 \leq 2.000 \qquad \text{Conditional expression (1)}$$

is satisfied. Therefore, it is possible to suppress the first lens 10 from being damaged by impact. In addition, it is possible to prevent the first lens 10 from becoming too thick to obtain suitable negative power.

11 Claims, 30 Drawing Sheets

(51) Int. Cl.
*G02B 9/10* (2006.01)
*G02B 13/00* (2006.01)

(56) References Cited

FOREIGN PATENT DOCUMENTS

| JP | 2007279632 | 10/2007 |
| JP | 2013073156 | 4/2013 |
| JP | 2015190999 | 11/2015 |
| JP | 2016057562 | 4/2016 |

OTHER PUBLICATIONS

"Office Action of China Counterpart Application", issued on Nov. 8, 2022, with English translation thereof, pp. 1-12.

WIDE-ANGLE LENS

CROSS-REFERENCE TO RELATED APPLICATION

This application is a 371 application of the International PCT application serial no. PCT/JP2020/024900, filed on Jun. 24, 2020, which claims the priority benefits of Japan Patent Application No. 2019-116153, filed on Jun. 24, 2019. The entirety of each of the above-mentioned patent applications is hereby incorporated by reference herein and made a part of this specification.

TECHNICAL FIELD

The present invention relates to a wide-angle lens used in various imaging systems.

BACKGROUND ART

In wide-angle lenses, a lens configuration of 6 lenses in 5 groups has been proposed in order to obtain high resolution (see Patent Literature 1). In the wide-angle lens described in Patent Literature 1, a front group, an aperture, and a rear group are disposed in order from an object side to an image side, and in the front group, at least a first lens and a second lens are disposed in order from a most object side to an image side. The first lens is a negative meniscus lens whose lens surface on the image side is a concave curved surface, and the second lens is a negative meniscus lens whose lens surface on the image side is a concave curved surface. The wide-angle lenses described in Patent Literature 1 and other documents are used in sensor devices for automobiles.

CITATION LIST

Patent Literature

[Patent Literature 1] Japanese Unexamined Patent Application Publication 2016-57562

SUMMARY OF THE INVENTION

Problems to be Solved by the Invention

However, in the wide-angle lens described in Patent Literature 1 and the like, since the first lens is exposed to an outside, the first lens is subjected to external impacts such as stepping stones while a car is traveling. This may result in damage to the first lens.

In view of the above problem, an object of the present invention is to provide a wide-angle lens capable of obtaining suitable negative power even when a thickness of the first lens is increased in order to increase strength against impact.

Means for Solving the Problem

In order to solve the above-described problem, the wide-angle lens according to the present invention has, in order from the object side to the image side, a front group, an aperture, and a rear group are disposed, a first lens disposed on the most object side in the front group is a negative meniscus lens whose lens surface on the image side is a concave curved surface, and assuming that a central thickness in an optical axis direction of the first lens is T1 (mm) and a focal length of an entire lens system is f0 (mm), the following conditional expression:

$$1.500 \leq T1/f0 \leq 1.850$$

is satisfied.

In the present invention, the thickness of the first lens is large because a ratio (T1/f0) between the central thickness in the optical axis direction of the first lens T1 and the focal length of the entire lens system f0 exceeds a lower limit (1.500). Therefore, it is possible to suppress the first lens from being damaged by impact. Moreover, since the ratio (T1/f0) has an upper limit (1.500), it is possible to suppress the first lens from becoming too thick. Therefore, it is possible to prevent the first lens from becoming too thick to obtain suitable negative power.

In the present invention, in the front group, the first lens, a second lens, and a third lens are disposed in order from the most object side to the image side, and in the rear group, a fourth lens, a fifth lens, and a sixth lens are disposed in order from the most object side to the image side, the second lens is a negative lens in which an image-side lens surface is a concave curved surface, the third lens is a biconvex lens in which both an object-side lens surface and an image-side lens surface are convex curved surfaces, the fourth lens is a biconvex lens in which both an object-side lens surface and an image-side lens surface are convex curved surfaces, the fifth lens is a negative lens in which an image-side lens surface is a concave curved surface, the sixth lens is a biconvex lens in which an object-side lens surface and an image-side lens surface are convex curved surfaces, and it is desirable that the fifth lens and the sixth lens are cemented lenses in which the image-side lens surface of the fifth lens and the object-side lens surface of the sixth lens are cemented. In this way, the lens surface on the object side of the third lens can be made a convex curved surface so as to secure an imaging area. In addition, since the fourth lens with positive power is disposed behind the aperture, various aberrations can be corrected even at wide angles. Moreover, since the fourth lens with positive power is disposed behind the aperture, an incident angle to an image forming surface can be kept small. Therefore, it is possible to support high-pixel imaging elements. Furthermore, since the fifth group is a cemented lens consisting of the biconcave fifth lens and the biconvex sixth lens, it is advantageous in correcting a magnification chromatic aberration. Therefore, it is possible to suppress occurrence of magnification chromatic aberration due to the wide angle.

In the present invention, assuming that a sag amount of the object-side lens surface of the third lens is Sag31 (mm) and a diameter of the object-side lens surface of the third lens is D31 (mm), the following conditional expression:

$$0 < |Sag31/(D31/2)| < 0.060$$

is preferably satisfied by the sag amount Sag31 and the diameter D31. In an aspect as above, since an absolute value of a ratio (Sag31/(D31/2)) between the sag amount Sag31 of the object side lens surface of the third lens and a radius (D31/2) of the object side lens surface of the third lens exceeds the lower limit (0), the object side lens surface of the third lens does not become flat. Therefore, various aberrations can be properly corrected. In addition, since an upper limit (0.060) is set for the absolute value of the ratio (Sag31/(D31/2)), it is possible to avoid opposing of a concave curved surface with a large sag amount and a convex curved surface with a large sag amount to each other between the second lens and the third lens. Therefore, it is possible to suppress multiple reflections between the lens surface on the image side of the second lens and the lens surface on the object side of the third lens. Therefore, it is possible to suppress generation of ring-shaped ghosts caused by multiple reflections between the lens surface on the image side of the second lens and the lens surface on the object side of the third lens.

In the present invention, assuming that a focal length of the entire lens system is f0 (mm) and the focal length of the first lens is f1 (mm), the following conditional expression:

$$-6.000 < f1/f0 < -4.500$$

is preferably satisfied. In an aspect as above, since a ratio (f1/f0) between the focal length f0 of the entire lens system and the focal length f1 of the first lens exceeds a lower limit (−6.000), the wide-angle lens can be made wider, and the size can be made smaller. In addition, since an upper limit (−4.500) is set for the ratio (f1/f0) between the focal length f0 of the entire lens system and the focal length f1 of the first lens, refractive power of the first lens is appropriate, and various aberrations can be properly corrected.

In the present invention, assuming that the focal length of the first lens is f1 (mm) and the focal length of the second lens is f2 (mm), the following conditional expression:

$$2.000 < f1/f2 < 2.400$$

is preferably satisfied. In an aspect as above, since a ratio (f1/f2) between the focal length f1 of the first lens and the focal length f2 of the second lens exceeds the lower limit (2.000), the wide-angle lens can be made wider. In addition, since an upper limit (2.400) is set for the ratio (f1/f2) between the focal length f1 of the first lens and the focal length f2 of the second lens, distortion can be properly corrected.

In the present invention, assuming that the focal length of the entire lens system is f0 (mm) and the focal length of the third lens is f3 (mm), the following conditional expression:

$$3.500 < f3/f0 < 5.000$$

is preferably satisfied. In an aspect as above, since a ratio (f3/f0) between the focal length f0 of the entire lens system and the focal length f3 of the third lens exceeds the lower limit (3.500), it is possible to avoid the power of the third lens from becoming too strong. Therefore, various aberrations can be properly corrected. In addition, since an upper limit (5.000) is set for the ratio (f3/f0) between the focal length f0 of the entire lens system and the focal length f3 of the third lens, the lens diameter and an inter-object distance of the entire lens system can be reduced. Therefore, the wide-angle lens can be made smaller in size.

In the present invention, assuming that the focal length of the entire lens system is f0 (mm) and the focal length of the second lens is f2 (mm), the following conditional expression:

$$-2.800 < f2/f0 < -2.100$$

is preferably satisfied. In an aspect as above, since a ratio (f2/f0) between the focal length f0 of the entire lens system and the focal length f2 of the second lens exceeds the lower limit (−2.800), the lens diameter and the inter-object distance of the entire lens system can be reduced. Therefore, the wide-angle lens can be made smaller in size. In addition, since an upper limit (−2.100) is set for the ratio (f2/f0) between the focal length f0 of the entire lens system and the focal length f2 of the second lens, it is possible to avoid the power of the second lens from becoming too strong. Therefore, an imaging area can be secured, and various aberrations can be properly corrected.

In the present invention, assuming that the focal length of the entire lens system is f0 (mm) and the focal length of the fourth lens is f4 (mm), the following conditional expression:

$$2.800 < f4/f0 < 4.000$$

is preferably satisfied. In an aspect as above, since the ratio (f4/f0) between the focal length f0 of the entire lens system and the focal length f4 of the fourth lens exceeds the lower limit (2.800), it is possible to avoid the power of the fourth lens from becoming too strong. Therefore, various aberrations can be properly corrected. In addition, since an upper limit (4.000) was set for the ratio (f4/f0) between the focal length f0 of the entire lens system and the focal length f4 of the fourth lens, the lens diameter and the inter-object distance of the entire lens system can be reduced. Therefore, the wide-angle lens can be made smaller in size.

In the present invention, assuming that the focal length of the entire lens system is f0 (mm) and a composite focal length of the fourth lens, the fifth lens and the sixth lens is f456 (mm), the following conditional expression:

$$2.000 < f456/f0 < 3.000$$

is preferably satisfied. In an aspect as above, since the ratio (f456/f0) between the focal length f0 of the entire lens system and the composite focal length f456 of the fourth, fifth and sixth lenses exceeds the lower limit (2.000), it is possible to avoid the power of the rear group from becoming too strong. Therefore, various aberrations can be properly corrected. Therefore, high optical properties can be realized. In addition, since an upper limit (3.000) was set for the ratio (f456/f0) between the focal length f0 of the entire lens system and the composite focal length f456 of the fourth, fifth and sixth lenses, it is possible to avoid the power of the rear group from becoming too weak. Therefore, the wide-angle lens can be made smaller in size.

In the present invention, assuming that the focal length of the entire lens system is f0 (mm) and a composite focal length of the fifth lens and the sixth lens is f56 (mm), the following conditional expression:

$$5.000 < f56/f0 < 7.000$$

is preferably satisfied. In an aspect as above, the ratio (f56/f0) between the focal length f0 of the entire lens system and the composite focal length f56 of the fifth lens and the sixth lens is within a range of the conditions, whereby chromatic aberration can be properly corrected.

In the present invention, assuming that the focal length of the entire lens system is f0 (mm) and a radius of curvature on an optical axis of the image-side lens surface of the fourth lens is R42, the following conditional expression:

$$-5.000 < R42/f0 < -2.800$$

is preferably satisfied. In an aspect as above, since the ratio (R42/f0) between the focal length f0 of the entire lens system and the radius of curvature R42 of the lens surface on the optical axis on the image side of the fourth lens exceeds the lower limit (−5.000), various aberrations can be properly corrected. In addition, since an upper limit (−2.800) is set for the ratio (R42/f0) between the focal length f0 of the entire lens system and the radius of curvature R42 on the optical axis of the lens surface on the image side of the fourth lens, it is possible to suppress the radius of curvature on the optical axis of the lens surface on the image side of the fourth lens from becoming too small. Therefore, the lens surface on the image side of the fourth lens can be shaped.

In the present invention, assuming that the object-image distance of the entire lens system is d0 and the focal length of the entire lens system is f0, the following conditional expression:

$$10.000 < d0/f0 < 18.000$$

is preferably satisfied. In an aspect as above, since the ratio (d0/f0) between the object-image distance d0 of the entire lens system and the focal length f0 of the entire lens system exceeds the lower limit (10.000), a spherical aberration and distortion can be properly corrected. In addition, since an upper limit (18.000) is set for the ratio (d0/f0) between the object-image distance d0 of the entire lens system and the focal length f0 of the entire lens system, it is possible to suppress the lens diameter from becoming too large and to avoid the total length of the entire lens system from becoming too long. Therefore, the wide-angle lens can be made smaller in size.

Effect of the Invention

In the present invention, the thickness of the first lens is large because a ratio (T1/f0) between the central thickness in the optical axis direction of the first lens T1 and the focal length of the entire lens system f0 exceeds a lower limit (1.500). Therefore, it is possible to suppress the first lens from being damaged by impact. Moreover, since the ratio (T1/f0) has an upper limit (1.500), it is possible to suppress the first lens from becoming too thick. Therefore, it is possible to prevent the first lens from becoming too thick to obtain suitable negative power.

MODE FOR CARRYING OUT THE INVENTION

Embodiments 1, 2, 3, 4, 5, and 6 will be described below as wide-angle lenses 100 to which the present invention is applied. In the invention of the present application, a "lens surface diameter (Diameter)" refers to an optical effective diameter in a lens surface. The effective diameter is a diameter of a circle that is formed of outermost points in a radial direction (farthest points from an optical axis) when a point of intersection between all light beams contributing to image formation and the lens surface is considered. A "sag amount (Sag)" is a distance from a point on an optical axis L of an imaginary reference plane at an outermost circumference of the effective diameter of the lens surface to a point on the optical axis L of the lens surface when an imaginary plane that is orthogonal to the optical axis is set as the imaginary reference plane. Moreover, when the sag amount has a positive value, the point on the optical axis L in the imaginary reference plane is located closer to an object side than the point on the optical axis L of the lens surface, while when the sag amount has a negative value, the point on the optical axis L in the imaginary reference plane is located closer to an image side than the point on the optical axis L of the lens surface.

Embodiment 1

Figure 1:
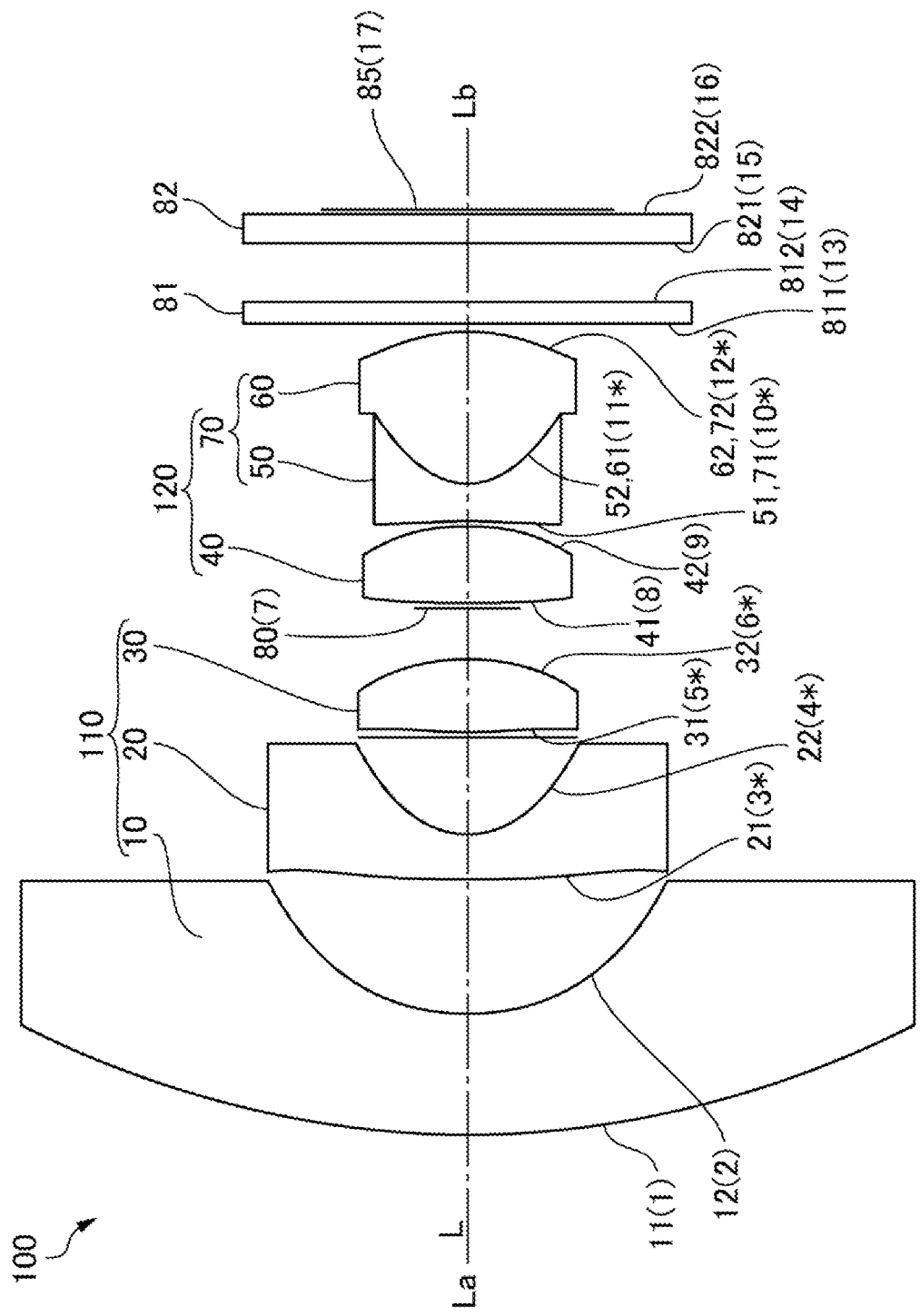
FIG. 1 is an explanatory view of a wide-angle lens according to Embodiment 1 of the present invention.

FIG. 1 is an explanatory view of a wide-angle lens 100 according to Embodiment 1 of the present invention. In FIG. 1, aspheric surfaces are marked with "*" to indicate a surface number. As shown in FIG. 1, the wide-angle lens 100 of this embodiment has a front group 110, an aperture 80, a rear group 120, and an infrared cut filter 81 disposed in order from an object side La to an image side Lb. The front group 110 includes a first lens 10, a second lens 20, and a third lens 30 disposed from a most object side La to an image side Lb. The rear group 120 includes a fourth lens 40, a fifth lens 50, and a sixth lens 60 disposed from the object side La to the image side Lb. A flat plate-shaped infrared cut filter 81, a translucent cover 82, and an imaging element 85 are disposed in order on the image side Lb relative to the sixth lens.

The first lens 10 is a negative meniscus lens (meniscus lens having negative power) in which a lens surface 102 (second surface 2) on the image side Lb is a concave curved surface, and a lens surface 11 (first surface 1) on the object side La is a convex curved surface. The second lens is a negative lens (a lens having negative power) in which a lens surface 22 (fourth surface 4) on the image side Lb is a concave curved surface, and a lens surface 21 (third surface 3) on the object side La is a convex curved surface. The third lens 30 is a biconvex lens in which both a lens surface 31 (the fifth surface 5) on the object side La and a lens surface 32 (the sixth surface 6) on the image side Lb are convex curved surfaces, and is a positive lens (lens having positive power). The fourth lens 40 is a biconvex lens in which both a lens surface 41 (seventh surface 7) on the object side La and a lens surface 42 (eighth surface 8) on the image side Lb are convex curved surfaces and is a positive lens (lens having positive power). The fifth lens is a negative lens (lens having negative power) whose lens surface 52 (eleventh surface 11) on the image side Lb is a concave curved surface, and the lens surface 51 (tenth surface 10) on the object side La of the fifth lens 50 is a concave curved surface. The sixth lens 60 is a biconvex lens in which a lens surface 61 on the object side La and a lens surface 62 on the image side Lb (twelfth surface 12) are convex curved surfaces and is a positive lens (a lens having positive power). The fifth lens 50 and the sixth lens 60 constitute a cemented lens 70 in which the lens surface 52 on the image side Lb of the fifth lens 50 and the lens surface 61 on the object side La of the sixth lens 60 are cemented by an adhesive (not shown), and the lens surface 52 on the image side Lb of the fifth lens 50 and the lens surface 61 on the object side La of the sixth lens 60 constitute an eleventh surface 11. According to such a configuration, the chromatic aberration can be properly corrected because the fifth lens 50 and the sixth lens 60 constitute a cemented lens 70 on the image side Lb relative to the aperture 80. The adhesive is preferably a material that remains elastic after being cured.

The aperture 80 constitutes the seventh surface 7. A surface 811 on the object side La of the infrared cut filter 81 constitutes a thirteenth surface 13, and a surface 812 on the image side Lb constitutes a fourteenth surface 14. A surface 821 on the object side La of the cover 82 constitutes a fifteenth surface 15, and a surface 822 on the image side Lb constitutes a sixteenth surface 16. An imaging surface of the imaging element 85 constitutes a seventeenth surface 17.

The second lens 20, the third lens 30, the fifth lens 50, and the sixth lens 60 are plastic lenses made of an acrylic resin system, a polycarbonate system, a polyolefin system, or the like. Therefore, it is possible to reduce a cost. Even in this case, the first lens 10 and the fourth lens 40 are glass lenses. The fourth lens 40 adjacent to the aperture 80 is a glass lens and has a small refractive index change accompanying a temperature change. Accordingly, temperature characteristics of the wide-angle lens 100 can be improved. Therefore, higher resolution can be realized over a wide temperature range. Moreover, since the first lens 10 located at the most object side La is a glass lens, the first lens 10 is not easily scratched or the like. In this embodiment, the lens surfaces 21 and 22 of the second lens 20, the lens surfaces 31 and 32 of the third lens 30, the lens surfaces 51 and 52 of the fifth lens 50, and the lens surfaces 61 and 62 of the sixth lens 60 are aspheric. The lens surfaces 11 and 12 of the first lens 10 and the lens surfaces 41 and 42 of the fourth lens 40 are spherical.

Lens Configuration

Configuration and the like of each lens of the wide-angle lens 100 of this embodiment is shown in Table 1, and Table 1 shows the following characteristics of the wide-angle lens 100. The values shown in Table 1 and Tables 2 to 7 below have been rounded to the nearest whole number.

Focal length f0 of the entire lens system (Effective Focal Length)

Object-image distance d0 of the entire lens system (Total Track)

F value of the entire lens system (Image Space)

Half Field of Angle

Table 1 also shows the following items for each surface. Units of a radius of curvature, a thickness and a focal length are mm. Here, when the lens surface is a convex curved surface protruding toward the object side or a concave curved surface concaved toward the object side, the radius of curvature is set to a positive value, and when the lens surface is a convex curved surface protruding toward the image side or a concave curved surface concaved toward the image side, the radius of curvature is set to a negative value.

Radius of curvature (Radius)

Thickness (Thickness)

Refractive index Nd

Abbe number vd

Focal length f

Moreover, Table 1 shows aspherical coefficients A4, A6, A8, A10 . . . when a shape of the aspheric surface is expressed by an expression below (Formula 1). In the expression below, a sag amount (axis in an optical axis direction) is z, a height in a direction perpendicular to the optical axis (ray height) is r, a cone coefficient is k, and a reciprocal of the radius of curvature is c.

$$Z = \frac{cr^2}{1+\sqrt{1-(1+K)c^2r^2}} + \sum_{n=2}^{5} A_{2n} r^{2n} \qquad \text{[Formula 1]}$$

TABLE 1

| | | | | | | | | | | |
|---|---|---|---|---|---|---|---|---|---|---|
| Effective Focal Length f0 | | | | | | 0.912 mm | | | | |
| Total Track d0 | | | | | | 12.463 mm | | | | |
| Image Space F/# | | | | | | 2.03 | | | | |
| Half Field of Angle | | | | | | 110 deg | | | | |

| Surf | Radius | Thickness | Nd | vd | Diameter | Sag | f | f | f | f |
|---|---|---|---|---|---|---|---|---|---|---|
| 1 | 12.734 | 1.619 | 1.870 | 40.5 | 12.003 | 1.503 | −4.690 | −1.191 | 32.756 | |
| 2 | 2.909 | 1.821 | | | 5.367 | 1.786 | | | | |

TABLE 1-continued

| | | | | | | | | | |
|---|---|---|---|---|---|---|---|---|---|
| 3* | 157.059 | 0.598 | 1.550 | 56.4 | 5.367 | 0.080 | −2.254 | | |
| 4* | 1.229 | 1.374 | | | 3.024 | 1.243 | | | |
| 5* | 9.030 | 0.995 | 1.642 | 24.2 | 2.929 | 0.037 | 3.409 | 2.014 | 2.607 |
| 6* | −2.763 | 0.669 | | | 2.970 | −0.441 | | | |
| 7(stop) | Infinity | 0.069 | | | | | | | |
| 8 | 11.765 | 1.050 | 1.804 | 46.3 | 2.800 | 0.084 | 2.947 | 2.708 | |
| 9 | −2.849 | 0.060 | | | 2.800 | −0.368 | | | |
| 10* | −24.949 | 0.498 | 1.642 | 24.2 | 1.986 | −0.047 | −1.289 | 5.518 | |
| 11* | 0.863 | 2.073 | 1.550 | 56.4 | 2.511 | 0.942 | 1.478 | | |
| 12* | −2.077 | 0.100 | | | 2.923 | −0.398 | | | |
| 13 | Infinity | 0.300 | | | | | | | |
| 14 | Infinity | 0.768 | | | | | | | |
| 15 | Infinity | 0.400 | | | | | | | |
| 16 | Infinity | 0.070 | | | | | | | |

| Surf | c (1/Radius) | K | A4 | A6 | A8 | A10 |
|---|---|---|---|---|---|---|
| 3 | 6.36704E−03 | 0.00000E+00 | 1.85968E−02 | −3.23942E−03 | −1.12025E−04 | 5.59540E−05 |
| 4 | 8.13771E−01 | −1.00000E+00 | 5.18753E−02 | 1.46973E−02 | 1.92409E−02 | −1.23604E−02 |
| 5 | 1.10736E−01 | 0.00000E+00 | −1.88525E−02 | 1.74278E−02 | −9.25972E−03 | 4.35823E−03 |
| 6 | −3.61916E−01 | 0.00000E+00 | 2.02050E−02 | 7.76870E−03 | −2.99549E−03 | −1.71495E−03 |
| 10 | −4.00816E−02 | 0.00000E+00 | −1.87608E−02 | −1.94575E−02 | 3.94528E−02 | −4.84194E−02 |
| 11 | 1.15934E+00 | −1.00000E+00 | 9.50681E−02 | −7.25104E−02 | 2.06821E−03 | 1.77497E−02 |
| 12 | −4.81506E−01 | −1.00000E+00 | 3.83919E−02 | −2.86114E−02 | 2.17271E−02 | −7.47041E−03 |

As shown in Table 1, in the wide-angle lens 100 of this embodiment, the focal length f0 of the entire lens system is 0.912 mm, the object-image distance d0 of the entire lens system, which is the distance from the lens surface 11 on the object side La of the first lens 10 to the imaging element 85, is 12.463 mm, the F-value of the entire lens system is 2.03 and the half field of angle is 110 deg.

Aberration Characteristics of Wide-Angle Lens 100

Figure 2:
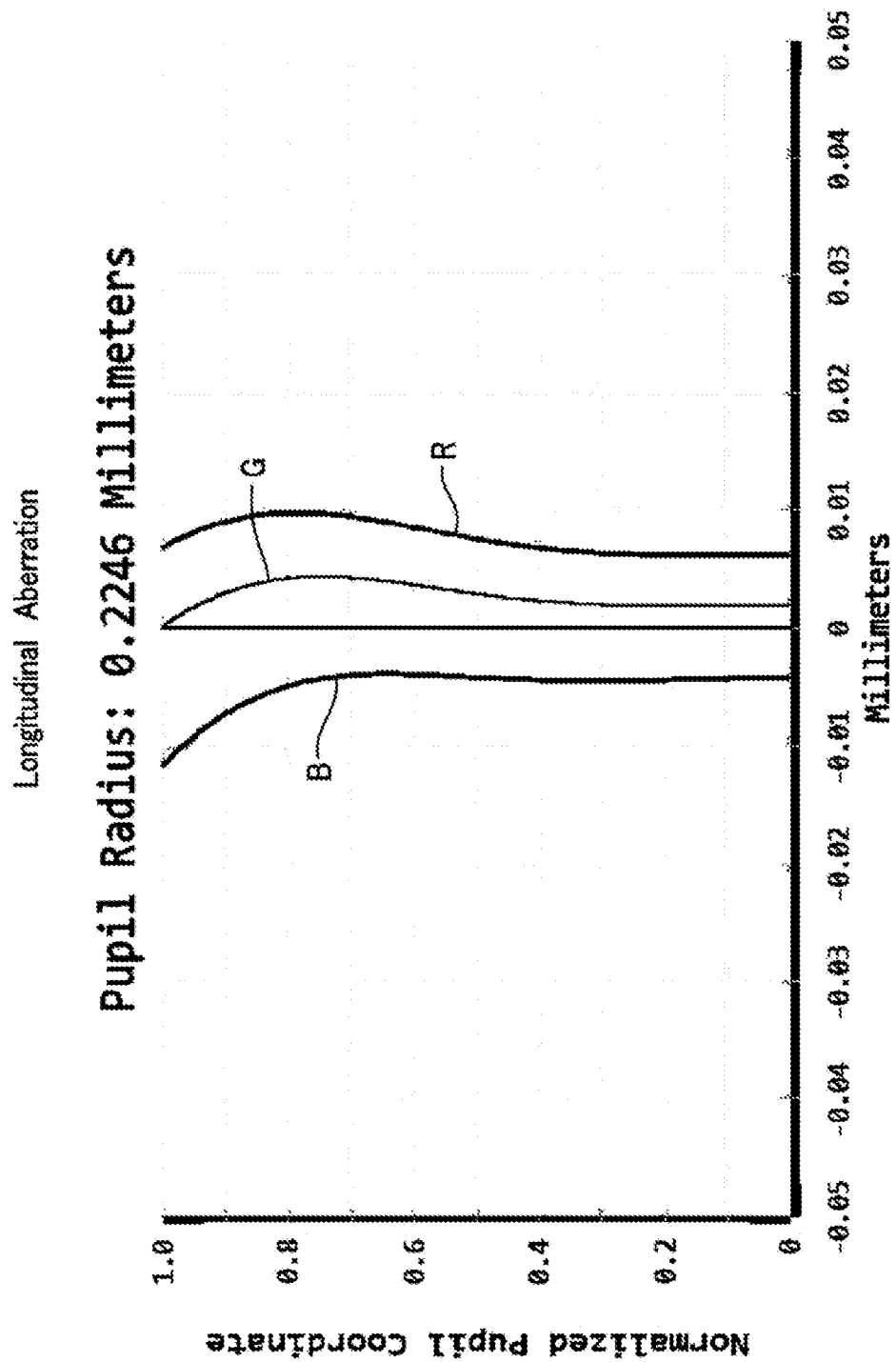
FIG. 2 is an explanatory graph showing a spherical aberration of the wide-angle lens shown in FIG. 1.
Figure 3:
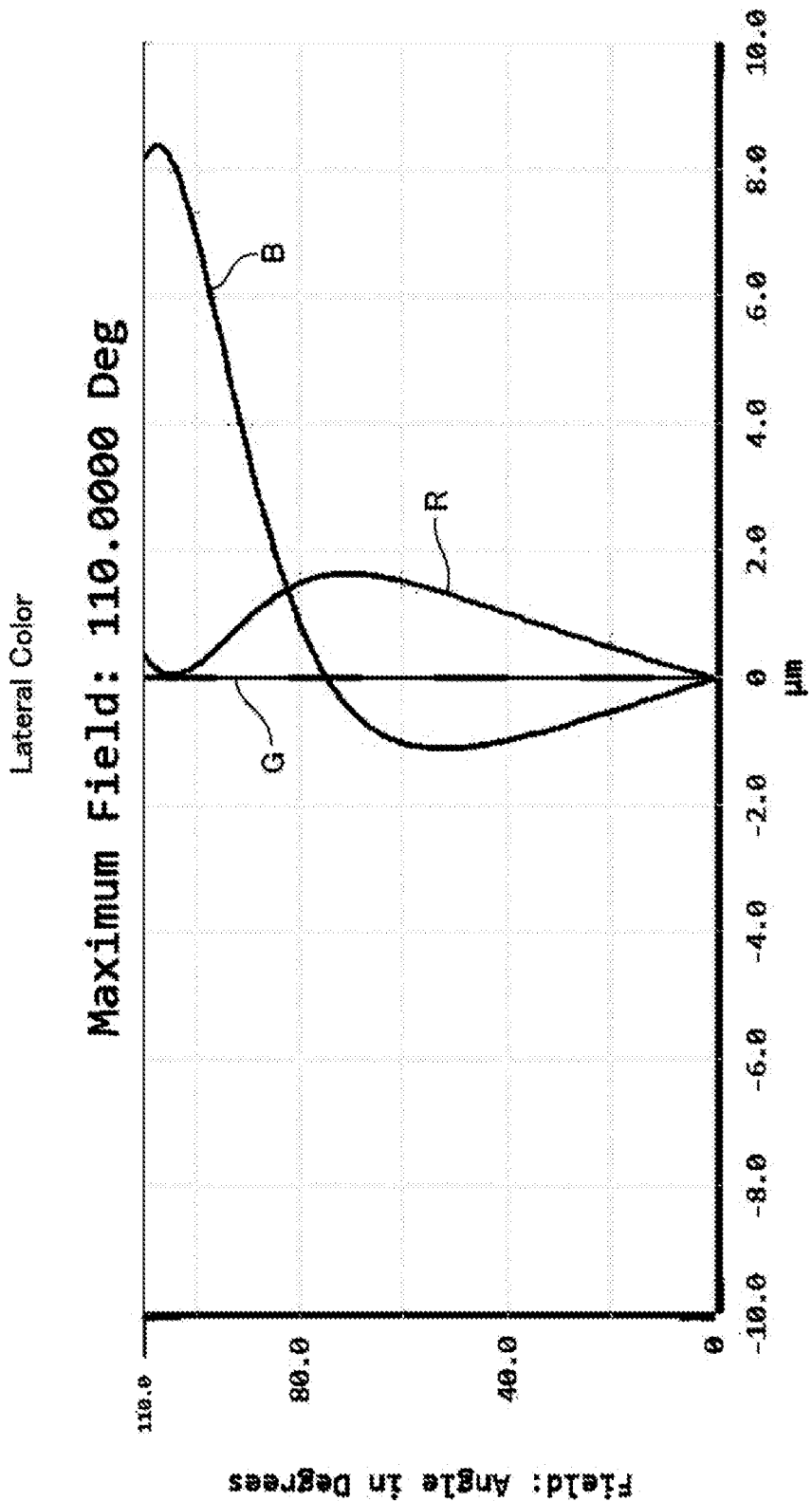
FIG. 3 is an explanatory graph showing a magnification chromatic aberration of the wide-angle lens shown in FIG. 1.
Figure 4:
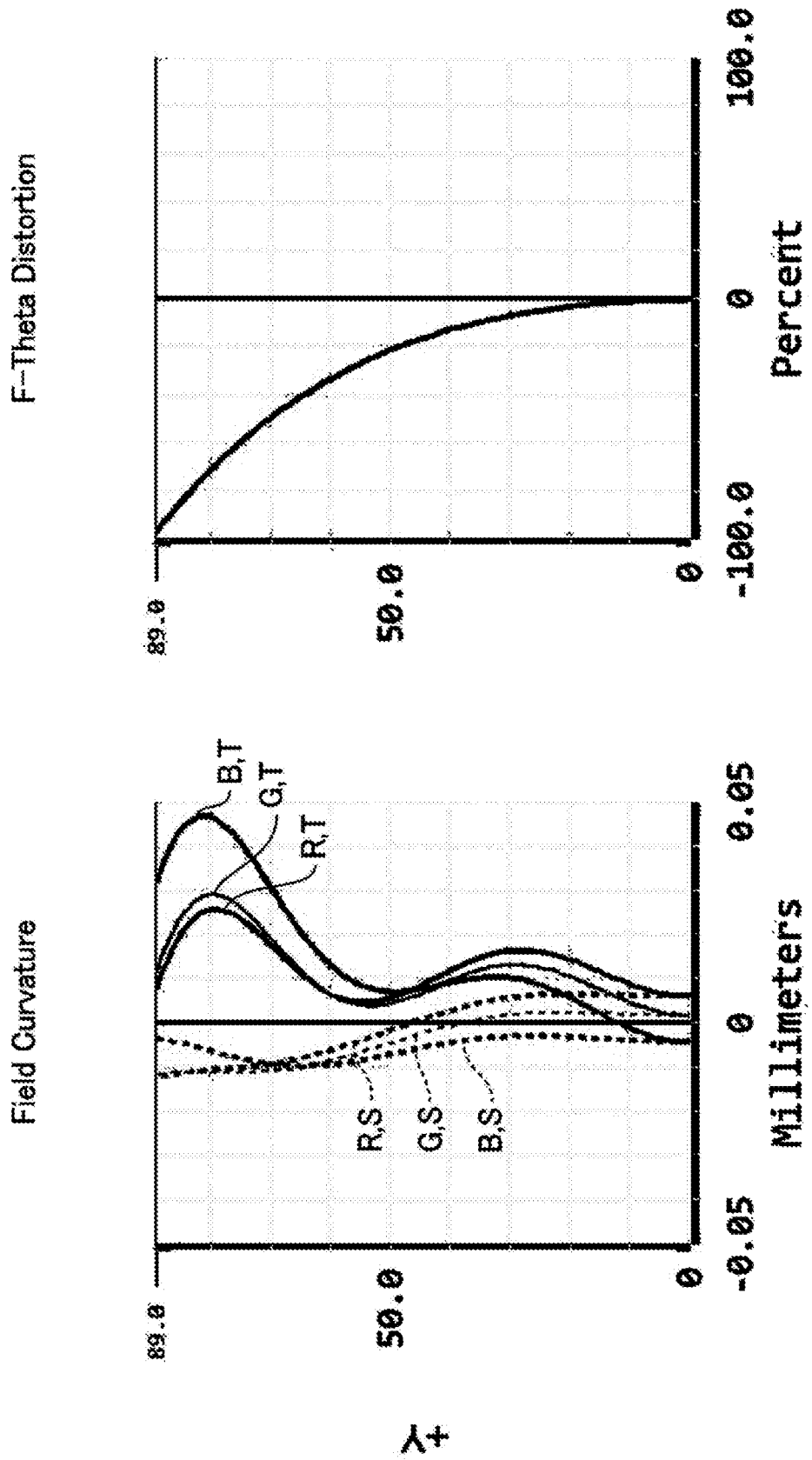
FIG. 4 is an explanatory graph showing astigmatism and distortion of the wide-angle lens shown in FIG. 1.
Figure 5:
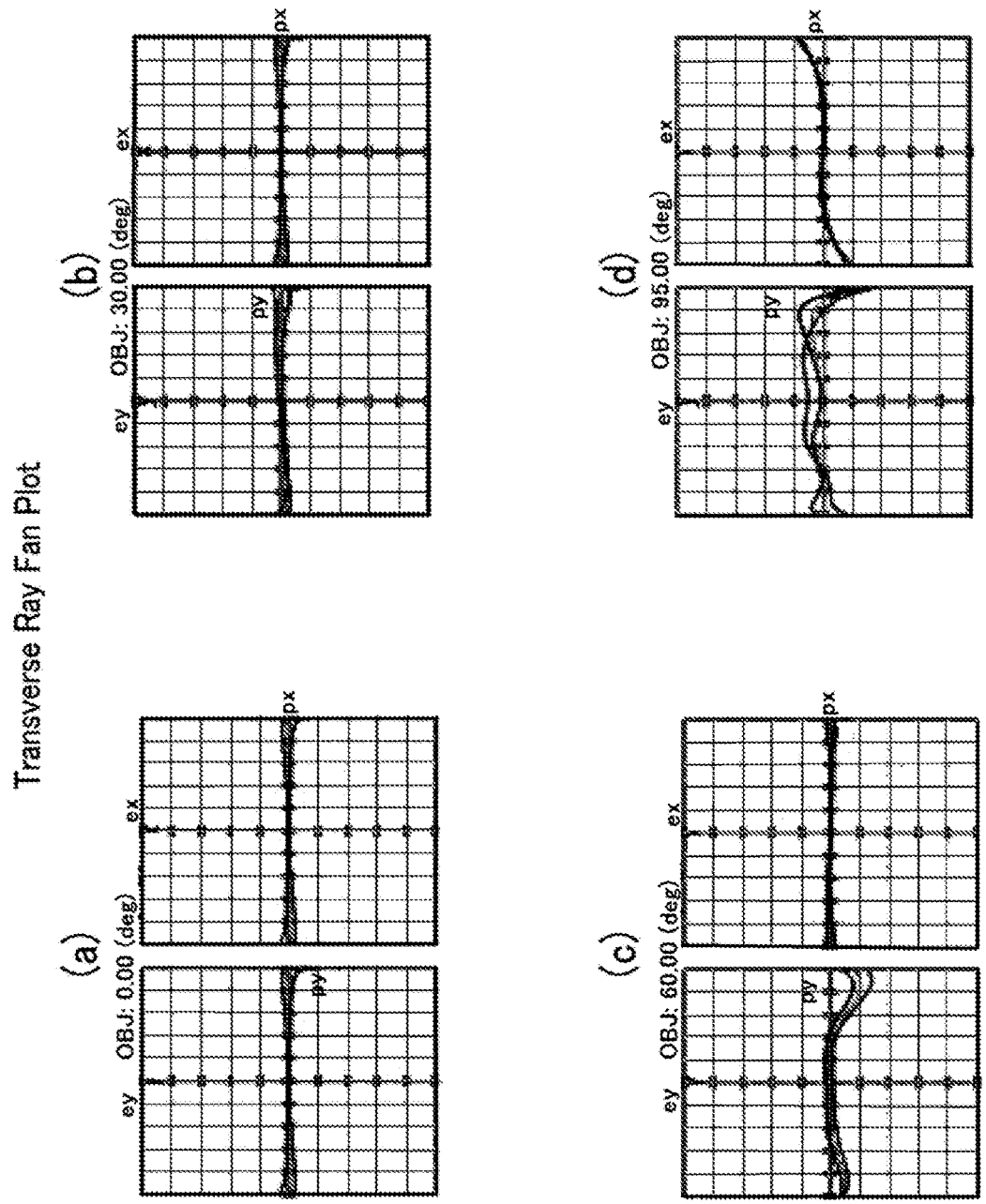
FIG. 5 is an explanatory graph showing a lateral aberration of the wide-angle lens shown in FIG. 1.

FIG. 2 is an explanatory graph showing a spherical aberration of the wide-angle lens 100 shown in FIG. 1. FIG. 3 is an explanatory graph showing a magnification chromatic aberration of the wide-angle lens 100 shown in FIG. 1, showing the magnification chromatic aberration at a maximum angle of view (110.000 deg/half angle). FIG. 4 is an explanatory graph showing astigmatism and distortion of the wide-angle lens 100 shown in FIG. 1. FIG. 5 is an explanatory graph of a lateral aberration of the wide-angle lens 100 shown in FIG. 1, and FIGS. 5(*a*), 5(*b*), 5(*c*) and 5(*d*) show the lateral aberration in a tangential direction (Y direction) and a sagittal direction (X direction) at angles of 0°, 30°, 60° and 95° formed with respect to the optical axis.

It is to be noted that, in FIGS. 2 to 5, B, G and R are indicated for each aberration at wavelengths of 486 nm, 588 nm and 656 nm. Moreover, regarding the astigmatism shown in FIG. 4, characteristics in the sagittal direction are given S, and characteristics in the tangential direction are given T. Furthermore, the distortion shown in FIG. 4 indicates a ratio of an image change between an imaging center part and a peripheral part of the image, and it can be considered that the smaller an absolute value of a numerical value indicating the distortion is, the more precise the lens is.

As shown in FIGS. 2 to 5, spherical aberration, magnification chromatic aberration, astigmatism (distortion) and lateral aberration are corrected to an appropriate level in the wide-angle lens 100 of this embodiment.

Composition Regarding Impact Countermeasures, Etc.

Table 2 shows respective numerical values corresponding to conditional expressions described below, and FIG. 2 also shows the numerical values for Examples 2 to 6 described below. It is to be noted that Table 2 shows the respective numerical values corresponding to the conditional expressions described below, and FIG. 2 also shows the numerical values for Examples 2 to 4 described below. It is to be noted that the ratios shown in Table 2 are calculated using the values before rounding each value shown in Tables 1, 3, 4, 5, 6, and 7, and then the values are fractionalized by rounding.

TABLE 2

| Condition | | Embodiment 1 | Embodiment 2 | Embodiment 3 | Embodiment 4 | Embodiment 5 | Embodiment 6 |
|---|---|---|---|---|---|---|---|
| (1) | 1.500 ≤ T1/f0 ≤ 2.000 | 1.776 | 1.736 | 1.736 | 1.680 | 1.992 | 1.614 |
| (2) | 0 < \|Sag31/(D31/2)\| < 0.060 | 0.025 | 0.035 | 0.035 | 0.036 | 0.002 | 0.035 |
| (3) | −6.000 < f1/f0 < −4.500 | −5.144 | −5.404 | −5.404 | −5.242 | −5.092 | −5.074 |
| (4) | 2.000 < f1/f2 < 2.400 | 2.081 | 2.165 | 2.166 | 2.077 | 2.265 | 1.958 |
| (5) | 3.500 < f3/f0 < 5.000 | 3.738 | 4.111 | 4.110 | 4.050 | 3.566 | 4.405 |
| (6) | −2.800 < f2/f < −2.100 | −2.472 | −2.496 | −2.494 | −2.524 | −2.248 | −2.591 |
| (7) | 2.800 < f4/f0 < 4.000 | 3.232 | 3.090 | 3.090 | 3.068 | 2.968 | 3.570 |
| (8) | 2.000 < f456/f0 < 3.000 | 2.970 | 2.891 | 2.891 | 2.904 | 2.988 | 2.951 |
| (9) | 5.000 < f56/f0 < 7.000 | 6.052 | 5.931 | 5.923 | 6.251 | 5.764 | 6.270 |
| (10) | −5.000 < R42/f0 < −2.800 | −3.125 | −3.120 | −3.120 | −3.105 | −2.641 | −3.387 |
| (11) | 10.000 < L/f0 < 18.000 | 13.669 | 13.561 | 13.560 | 13.395 | 13.643 | 13.375 |

As shown in Table 1 and Table 2, assuming that the central thickness in the optical axis direction of the first lens 10 is T1 (mm) and the focal length of the entire lens system is f0 (mm), the following conditional expression (1):

$1.500 \leq T1/f0 \leq 2.000$     Conditional expression (1)

is satisfied.
In this condition, more preferably, $1.600 \leq T1/f0 \leq 1.850$     Conditional expression (1a)

is satisfied. More specifically, the central thickness T1 in the optical axis direction of the first lens 10 is 1.691 mm, and the focal length f0 of the entire lens system is 0.912 mm. Therefore, the ratio (T1/f0) is 1.776, which satisfies the conditional expression (1).

Since the ratio (T1/f0) exceeds the lower limit (1.500), the thickness of the first lens becomes larger. Therefore, it is possible to suppress the first lens 10 from being damaged by impact. Moreover, since the ratio (T1/f0) has an upper limit (1.500), it is possible to suppress the first lens 10 from becoming too thick. Therefore, it is possible to prevent the first lens 10 from becoming too thick to obtain suitable negative power.

Assuming that the sag amount of the lens surface 31 on the object side La of the third lens 30 is Sag31 (mm) and the diameter of the lens surface 31 on the object side La of the third lens 30 is D31 (mm), the following conditional expression (2):

$0 < |Sag31/(D31/2)| < 0.060$     Conditional expression (2)

is satisfied by the sag amount Sag31 and the diameter D31. More specifically, Sag31 is 0.037 mm and D31 is 2.929 mm. Therefore, the absolute value of the ratio (Sag31/(D31/2)) is 0.025, which satisfies the conditional expression (2).

Since the absolute value of the ratio (Sag31/(D31/2)) exceeds the lower limit (0), the lens surface 31 on the object side La of the third lens 30 does not become flat. Therefore, various aberrations can be properly corrected. In addition, since an upper limit (0.060) is set for the absolute value of the ratio (Sag31/(D31/2)), it is possible to avoid opposing of a concave curved surface with a large sag amount and a convex curved surface with a large sag amount to each other between the second lens and the third lens. Therefore, it is possible to suppress multiple reflections between the lens surface on the image side of the second lens and the lens surface on the object side of the third lens. Thus, it is possible to suppress generation of ring-shaped ghosts caused by the multiple reflections between the lens surface 22 on the image side Lb of the second lens 20 and the lens surface 31 on the object side La of the third lens 30.

Assuming that the focal length of the entire lens system is f0 (mm) and the focal length of the first lens 10 is f1 (mm), the following conditional expression (3):

$-6.000 < f1/f0 < -4.500$     Conditional expression (3)

is satisfied. More specifically, the focal length f0 of the entire lens system is 0.912 mm, and the focal length f1 of the first lens 10 is −4.690 mm. Therefore, the ratio (f1/f0) is −5.144, which satisfies the conditional expression (3).

Since the ratio (f1/f0) exceeds the lower limit (−6.000), the wide-angle lens 100 can be made wider, and the size can be made smaller. In addition, since an upper limit (−4.500) is set for the ratio (f1/f0), the refractive power of the first lens 10 becomes appropriate, and various aberrations can be properly corrected.

Assuming that the focal length of the first lens 10 is f1 (mm) and the focal length of the second lens 20 is f2 (mm), the following conditional expression (4):

$2.000 < f1/f2 < 2.400$     Conditional expression (4)

is satisfied. More specifically, the focal length f1 of the first lens 10 is −4.690 mm and the focal length f2 of the second lens 20 is −2.254 mm. Therefore, the ratio (f1/f2) is 2.081, which satisfies the conditional expression (4).

Since the ratio (f1/f2) exceeds the lower limit (2.000), the wide-angle lens 100 can be made wider. In addition, since an upper limit (2.400) is set for the ratio (f1/f2), distortion can be properly corrected.

Assuming that the focal length of the entire lens system is f0 (mm) and the focal length of the third lens is f3 (mm), the following conditional expression (5):

$3.500 < f3/f0 < 5.000$     Conditional expression (5)

is satisfied. More specifically, the focal length f0 of the entire lens system is 0.912 mm, and the focal length f3 of the third lens 30 is 3.409 mm. Therefore, the ratio (f3/f0) is 3.738, which satisfies the conditional expression (5).

Since the ratio (f3/f0) exceeds the lower limit (3.500), it is possible to avoid the power of the third lens 30 from becoming too strong. Therefore, various aberrations can be properly corrected. In addition, since an upper limit (5.000) is set for the ratio (f3/f0), the lens diameter and the inter-object distance d0 of the entire lens system can be reduced. Therefore, the wide-angle lens 100 can be made smaller in size.

Assuming that the focal length of the entire lens system is f0 (mm) and the focal length of the second lens 20 is f2 (mm), the following conditional expression (6):

$-2.800 < f2/f0 < -2.100$     Conditional expression (6)

is satisfied. More specifically, the focal length f0 of the entire lens system is 0.912 mm, and the focal length f2 of the second lens 20 is −2.254 mm. Therefore, the ratio (f2/f0) is −2.472, which satisfies the conditional expression (6).

Since the ratio (f2/f0) exceeds the lower limit (−2.800), the lens diameter and the inter-object distance d0 of the entire lens system can be reduced. Therefore, the wide-angle lens 100 can be made smaller in size. In addition, since an upper limit (−2.100) is set for the ratio (f2/f0), it is possible to avoid the power of the second lens 20 from becoming too strong. Therefore, an imaging area can be secured, and various aberrations can be properly corrected.

Assuming that the focal length of the entire lens system is f0 (mm) and the focal length of the fourth lens 40 is f4 (mm), the following conditional expression (7):

$2.800 < f4/f0 < 4.000$     Conditional expression (7)

is satisfied. More specifically, the focal length f0 of the entire lens system is 0.912 mm, and the focal length f4 of the fourth lens 40 is 2.947 mm. Therefore, the ratio (f4/f0) is 3.232, which satisfies the conditional expression (7).

Since the ratio (f4/f0) exceeds the lower limit (2.800), it is possible to avoid the power of the fourth lens 40 from becoming too strong. Therefore, various aberrations can be properly corrected. In addition, since an upper limit (4.000) is set for the ratio (f4/f0), the lens diameter and the inter-object distance d0 of the entire lens system can be reduced. Therefore, the wide-angle lens 100 can be made smaller in size.

Assuming that the focal length of the entire lens system is f0 (mm) and the composite focal length of the fourth, fifth, and sixth lenses 40, 50, and 60 is f456 (mm), the following conditional expression (8):

$2.000 < f456/f0 < 3.000$     Conditional expression (8)

is satisfied. More specifically, the focal length f0 of the entire lens system is 0.912 mm, and the composite focal length f456 of the fourth lens 40, the fifth lens 50, and the sixth lens 60 is 2.708 mm. Therefore, the ratio (f456/f0) is 2.970, which satisfies the conditional expression (8).

Since the ratio (f456/f0) exceeds the lower limit (2.000), it is possible to avoid the power of the rear group 120 from becoming too strong. Therefore, various aberrations can be properly corrected. Therefore, high optical properties can be realized. In addition, since an upper limit (3.000) is set for the ratio (f456/f0), it is possible to avoid the power of the rear group 120 from becoming too weak. Therefore, the wide-angle lens 100 can be made smaller in size.

Assuming that the focal length of the entire lens system is f0 (mm) and the composite focal length of the fifth lens 50 and the sixth lens 60 is f56 (mm), the following conditional expression (9):

$$5.000 < f56/f0 < 7.000 \quad \text{Conditional expression (9)}$$

is satisfied. More specifically, the focal length f0 of the entire lens system is 0.912 mm, and the composite focal length f56 of the fifth lens 50 and the sixth lens 60 is 5.518 mm. Therefore, the ratio (f56/f0) is 6.052, which satisfies the conditional expression (9).

Since the ratio (f56/f0) is within the range of the conditions, chromatic aberration can be properly corrected.

Assuming that the focal length of the entire lens system is f0 (mm) and a radius of curvature on the optical axis of the lens surface 42 on the image side Lb of the fourth lens 40 is R42, the following conditional expression (10):

$$-5.000 < R42/f0 < -2.800 \quad \text{Conditional expression (10)}$$

is satisfied. More specifically, the focal length f0 of the entire lens system is 0.912 mm, and the radius of curvature R42 on the optical axis of the lens surface 42 on the image side Lb of the fourth lens 40 is −2.849 mm. Therefore, the ratio (R42/f0) is −3.125, which satisfies the conditional expression (10).

Since the ratio (R42/f0) exceeds the lower limit (−5.000), various aberrations can be properly corrected. In addition, since an upper limit (−2.800) is set for the ratio (R42/f0), it is possible to suppress the radius of curvature on the optical axis of the lens surface 42 on the image side Lb of the fourth lens 40 from becoming too small. Therefore, the lens surface 42 on the image side Lb of the fourth lens 40 can be shaped.

Assuming that the object-image distance of the entire lens system is d0 and the focal length of the entire lens system is f0, the following conditional expression (11):

$$10.000 < d0/f0 < 18.000 \quad \text{Conditional expression (11)}$$

is satisfied. More specifically, the object-image distance d0 of the entire lens system is 12.463 mm, and the focal length f0 of the entire lens system is 0.912 mm. Therefore, the ratio (d0/f0) is 13.669, which satisfies the conditional expression (11).

Since the ratio (d0/f0) exceeds the lower limit (10.000), a spherical aberration and distortion can be properly corrected. Since an upper limit (18.000) is set for the ratio (d0/f0), it is possible to suppress the lens diameter from becoming too large and to avoid the total length of the entire lens system from becoming too long. Therefore, the wide-angle lens 100 can be made smaller in size.

Embodiment 2

Figure 6:
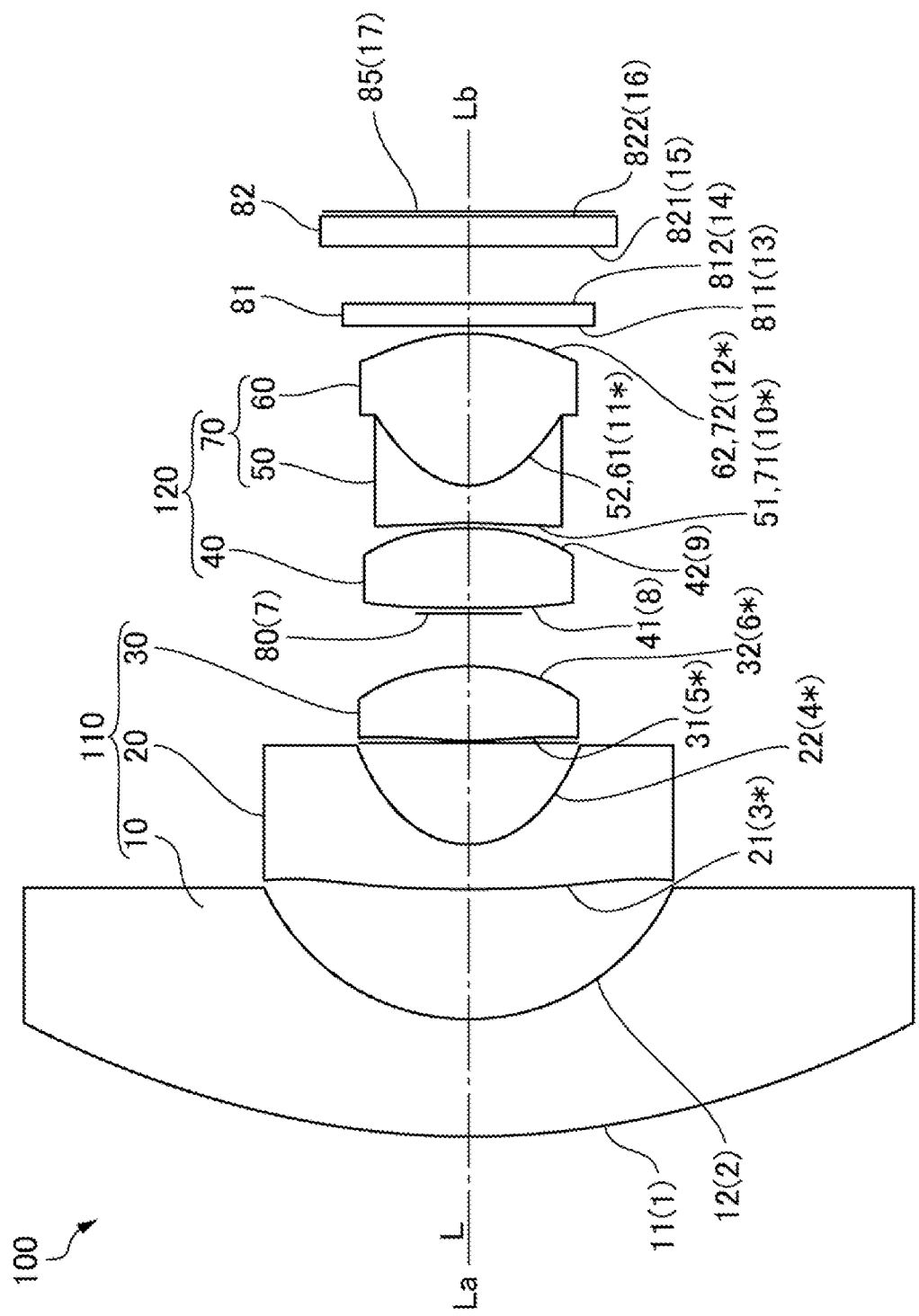
FIG. 6 is an explanatory view of a wide-angle lens according to Embodiment 2 of the present invention.
Figure 7:
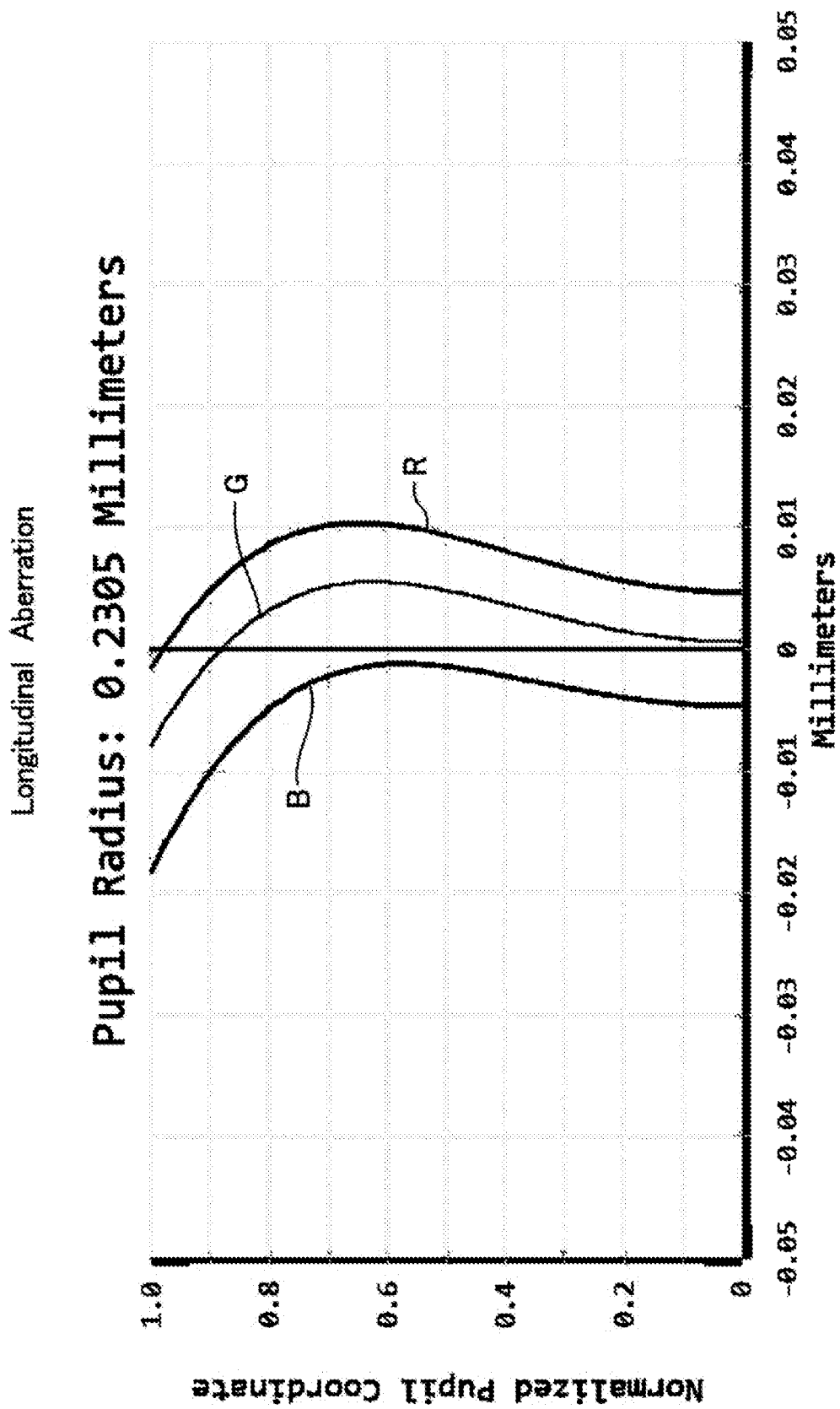
FIG. 7 is an explanatory graph showing a spherical aberration of the wide-angle lens shown in FIG. 6.
Figure 8:
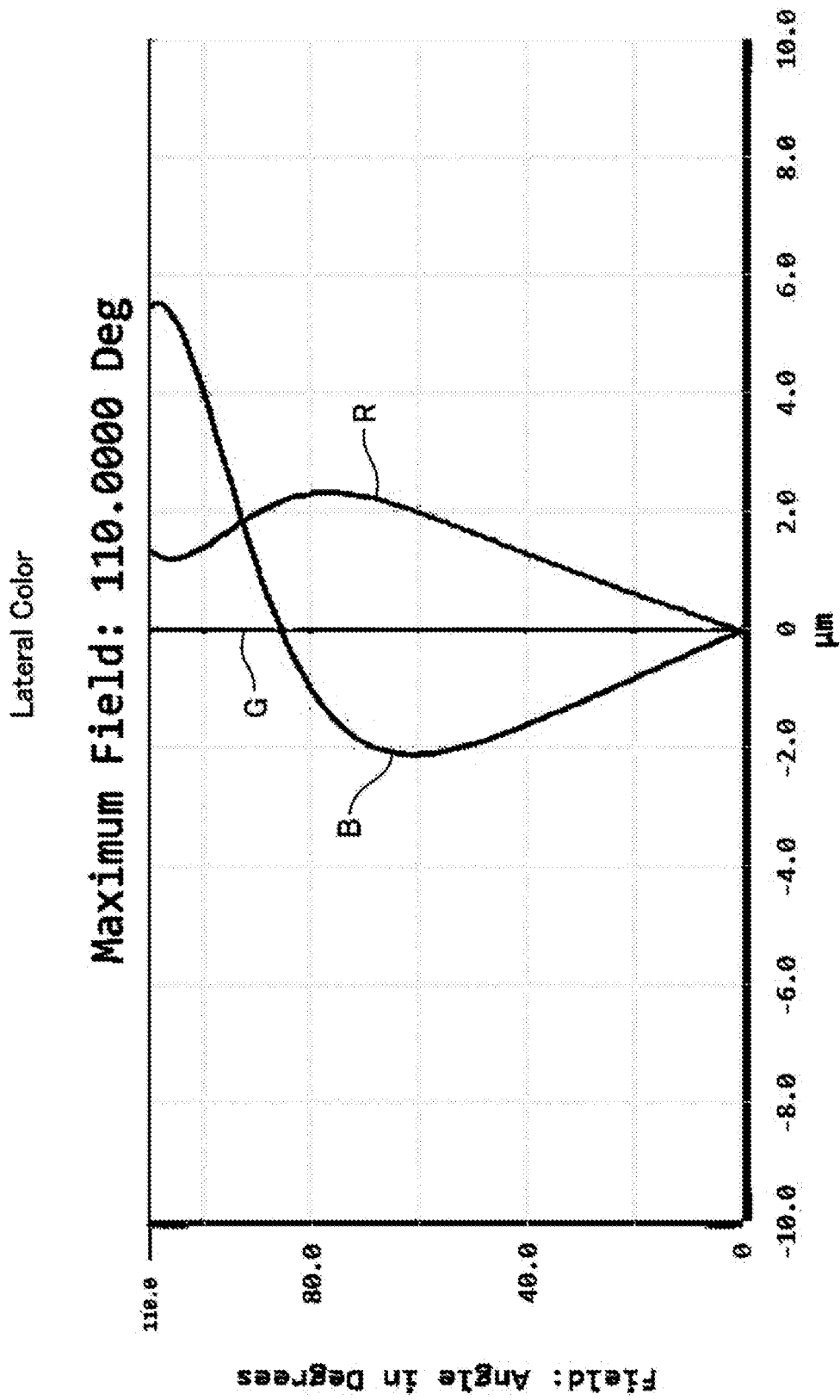
FIG. 8 is an explanatory graph showing a magnification chromatic aberration of the wide-angle lens shown in FIG. 6.
Figure 9:
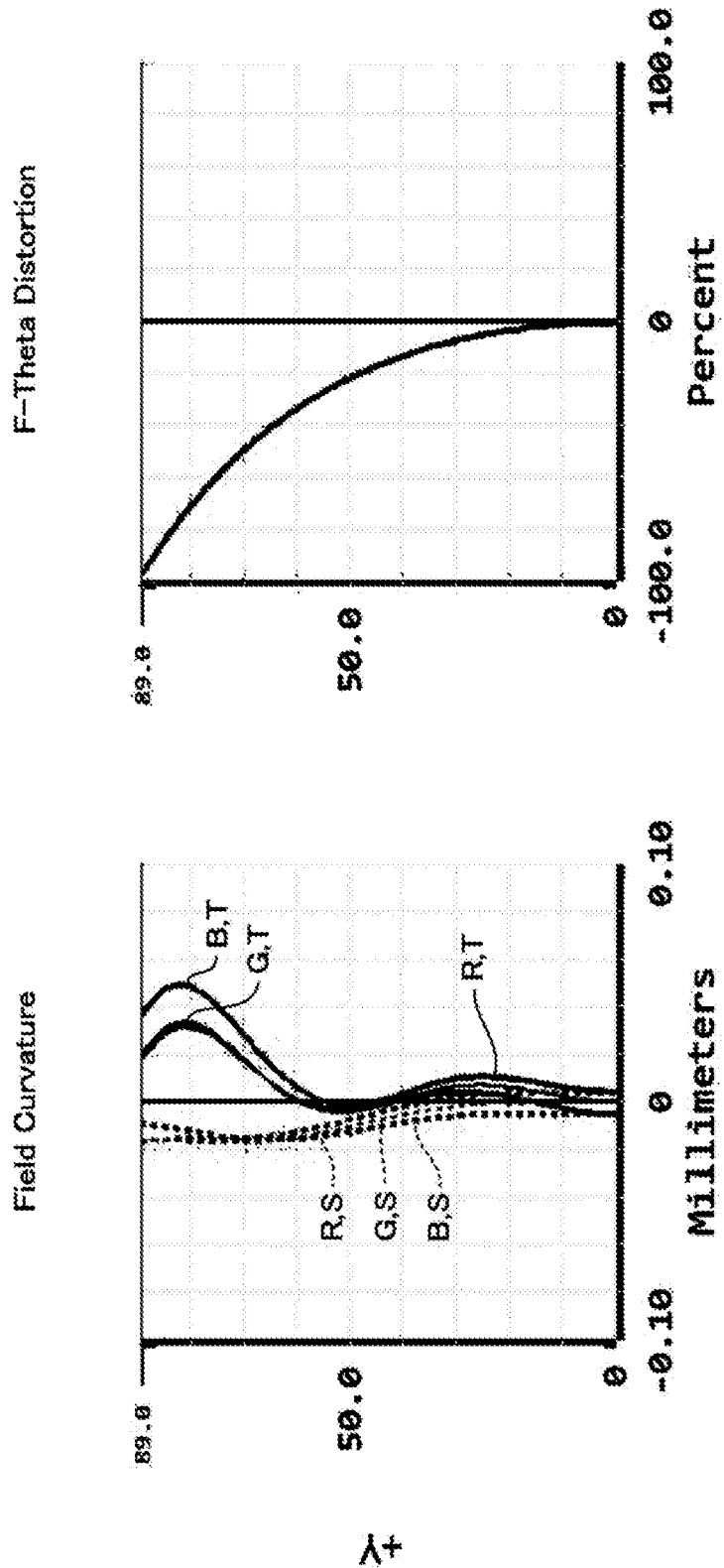
FIG. 9 is an explanatory graph showing astigmatism and distortion of the wide-angle lens shown in FIG. 6.
Figure 10:
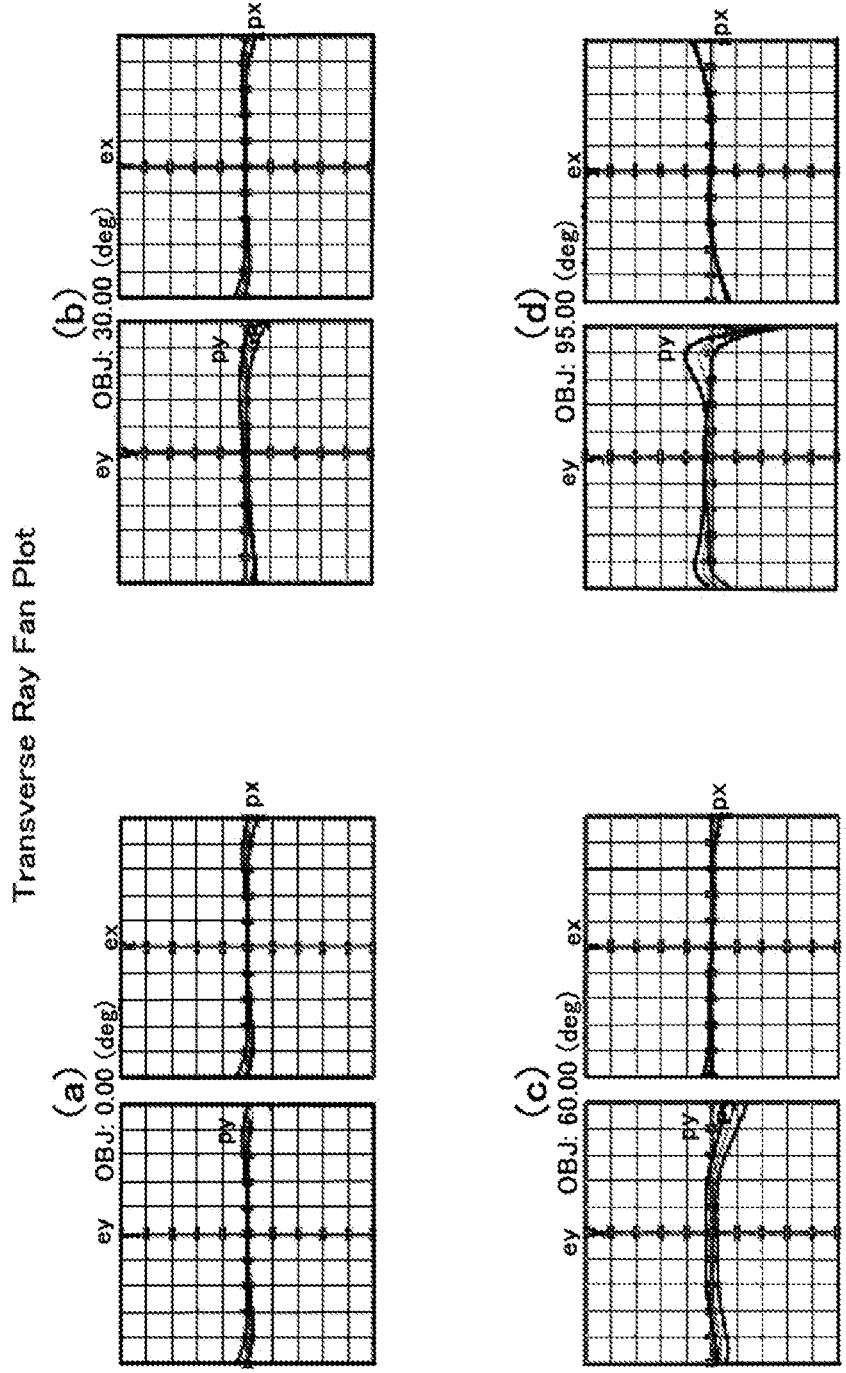
FIG. 10 is an explanatory graph showing a lateral aberration of the wide-angle lens shown in FIG. 6.

FIG. 6 is an explanatory view of the wide-angle lens 100 according to Embodiment 2 of the present invention. FIG. 7 is an explanatory graph showing a spherical aberration of the wide-angle lens 100 shown in FIG. 6. FIG. 8 is an explanatory graph showing a magnification chromatic aberration of the wide-angle lens 100 shown in FIG. 6, showing the magnification chromatic aberration at the maximum angle of view (110.000 deg/half angle). FIG. 9 is an explanatory graph showing astigmatism and distortion of the wide-angle lens 100 shown in FIG. 6. FIG. 10 is an explanatory graph showing a lateral aberration of the wide-angle lens 100 shown in FIG. 6, and FIGS. 10(a), 10(b), 10(c) and 10(d) show the lateral aberration in the tangential direction (Y direction) and the sagittal direction (X direction) at angles of 0°, 30°, 60° and 95° formed with respect to the optical axis.

As shown in FIG. 6, similarly to Embodiment 1, the wide-angle lens 100 of this embodiment also has the front group 110, the aperture 80, the rear group 120, and the infrared cut filter 81 disposed in order from the object side La to the image side Lb. The front group 110 includes a first lens 10, a second lens 20, and a third lens 30 disposed from a most object side La to an image side Lb. The rear group 120 includes a fourth lens 40, a fifth lens 50, and a sixth lens 60 disposed from the object side La to the image side Lb.

Configuration and the like of each lens of the wide-angle lens 100 of this embodiment is as shown in Table 3. In the wide-angle lens 100 of this embodiment, the focal length f0 of the entire lens system is 0.922 mm, the total length, which is the distance from the lens surface 11 of the first lens 10 to the imaging element 85, is 12.501 mm, the F-value of the entire lens system is 2.0, and the half angle of view is 110 deg. As shown in FIGS. 7 to 10, spherical aberration, magnification chromatic aberration, astigmatism (distortion) and lateral aberration are corrected to an appropriate level in the wide-angle lens 100 of this embodiment.

TABLE 3

| | | Effective Focal Length f0 | | | | | 0.922 mm | | | |
| | | Total Track d0 | | | | | 12.501 mm | | | |
| | | Image Space F/# | | | | | 2.00 | | | |
| | | Half Field of Angle | | | | | 110 deg | | | |
| Surf | Radius | Thickness | Nd | vd | Diameter | Sag | f | f | f | f |
| --- | --- | --- | --- | --- | --- | --- | --- | --- | --- | --- |
| 1 | 12.334 | 1.600 | 1.871 | 40.5 | 11.973 | 1.550 | −4.981 | −1.252 | −28.564 | |
| 2 | 3.015 | 1.761 | | | 5.474 | 1.750 | | | | |
| 3* | 24.015 | 0.600 | 1.544 | 56.4 | 5.474 | 0.088 | −2.301 | | | |
| 4* | 1.179 | 1.393 | | | 2.998 | 1.307 | | | | |
| 5* | 15.226 | 1.000 | 1.635 | 24.2 | 2.980 | 0.052 | 3.790 | 2.042 | | 2.590 |
| 6* | −2.785 | 0.701 | | | 2.923 | −0.397 | | | | |
| 7(stop) | Infinity | 0.069 | | | | | | | | |
| 8 | 9.337 | 1.100 | 1.804 | 46.3 | 2.800 | 0.106 | 2.848 | | 2.665 | |
| 9 | −2.876 | 0.069 | | | 2.800 | −0.364 | | | | |
| 10* | −26.312 | 0.500 | 1.635 | 24.2 | 2.027 | −0.045 | −1.364 | 5.468 | | |

TABLE 3-continued

| | | | | | | | |
|---|---|---|---|---|---|---|---|
| 11* | 0.902 | 2.069 | 1.544 | 56.4 | 2.506 | 0.933 | 1.531 |
| 12* | −2.072 | 0.100 | | | 2.936 | −0.395 | |
| 13 | Infinity | 0.300 | | | | | |
| 14 | Infinity | 0.770 | | | | | |
| 15 | Infinity | 0.400 | | | | | |
| 16 | Infinity | 0.070 | | | | | |

| Surf | c (1/Radius) | K | A4 | A6 | A8 | A10 |
|---|---|---|---|---|---|---|
| 3 | 4.16412E−02 | 0.00000E+00 | 8.37813E−03 | −1.82784E−03 | −1.10854E−06 | 2.01334E−05 |
| 4 | 8.48191E−01 | −1.00000E+00 | 4.91542E−02 | 4.48973E−03 | 1.36797E−02 | −6.13036E−03 |
| 5 | 6.56771E−02 | 0.00000E+00 | −1.25150E−02 | 4.84745E−03 | 1.01819E−03 | −7.38322E−04 |
| 6 | −3.59056E−01 | 0.00000E+00 | 3.95372E−03 | 3.77368E−03 | −1.95869E−03 | −8.02568E−05 |
| 10 | −3.80062E−02 | 0.00000E+00 | −2.55829E−02 | 3.22804E−04 | 1.14547E−02 | −2.00567E−02 |
| 11 | 1.10848E+00 | −1.00000E+00 | 6.59667E−02 | −4.03808E−02 | −7.94757E−03 | 1.77867E−02 |
| 12 | −4.82616E−01 | −1.00000E+00 | 3.28090E−02 | −2.02601E−02 | 1.81129E−02 | −6.95727E−03 |

As shown in Table 2, the wide-angle lens 100 of this embodiment satisfies the conditional expressions (1), (2), (3), (4), (5), (6), (7), (8), (9), (10), and (11) described in Embodiment 1, and thus has the same effect as Embodiment 1.

More specifically, the central thickness T1 in the optical axis direction of the first lens 10 is 1.600 mm, and the focal length f0 of the entire lens system is 0.922 mm. Therefore, the ratio (T1/f0) is 1.736, which satisfies the conditional expression (1) and the conditional expression (1a).

More specifically, Sag31 is 0.052 mm and D31 is 2.980. Therefore, the absolute value of the ratio (Sag31/(D31/2)) is 0.035, which satisfies the conditional expression (2).

More specifically, the focal length f0 of the entire lens system is 0.922 mm, and the focal length f1 of the first lens 10 is −4.981 mm. Therefore, the ratio (f1/f0) is −5.404, which satisfies the conditional expression (3).

More specifically, the focal length f1 of the first lens 10 is −4.981 mm and the focal length f2 of the second lens 20 is −2.301 mm. Therefore, the ratio (f1/f2) is 2.165, which satisfies the conditional expression (4).

More specifically, the focal length f0 of the entire lens system is 0.922 mm, and the focal length f3 of the third lens 30 is 3.790 mm. Therefore, the ratio (f3/f0) is 4.111, which satisfies the conditional expression (5).

More specifically, the focal length f0 of the entire lens system is 0.922 mm, and the focal length f2 of the second lens 20 is −2.301 mm. Therefore, the ratio (f2/f0) is −2.496, which satisfies the conditional expression (6).

More specifically, the focal length f0 of the entire lens system is 0.922 mm, and the focal length f4 of the fourth lens 40 is 2.848 mm. Therefore, the ratio (f4/f0) is 3.090, which satisfies the conditional expression (7).

More specifically, the focal length f0 of the entire lens system is 0.922 mm, and the composite focal length f456 of the fourth lens 40, the fifth lens 50, and the sixth lens 60 is 2.665 mm. Therefore, the ratio (f456/f0) is 2.891, which satisfies the conditional expression (8).

More specifically, the focal length f0 of the entire lens system is 0.922 mm, and the composite focal length f56 of the fifth lens 50 and the sixth lens 60 is 5.468 mm. Therefore, the ratio (f56/f0) is 5.931, which satisfies the conditional expression (9).

More specifically, the focal length f0 of the entire lens system is 0.922 mm, and the radius of curvature R42 on the optical axis of the lens surface 42 on the image side Lb of the fourth lens 40 is −2.876 mm. Therefore, the ratio (R42/f0) is −3.120, which satisfies the conditional expression (10).

More specifically, the object-image distance d0 of the entire lens system is 12.501 mm, and the focal length f0 of the entire lens system is 0.922 mm. Therefore, the ratio (d0/f0) is 13.561, which satisfies the conditional expression (11).

Embodiment 3

Figure 11:
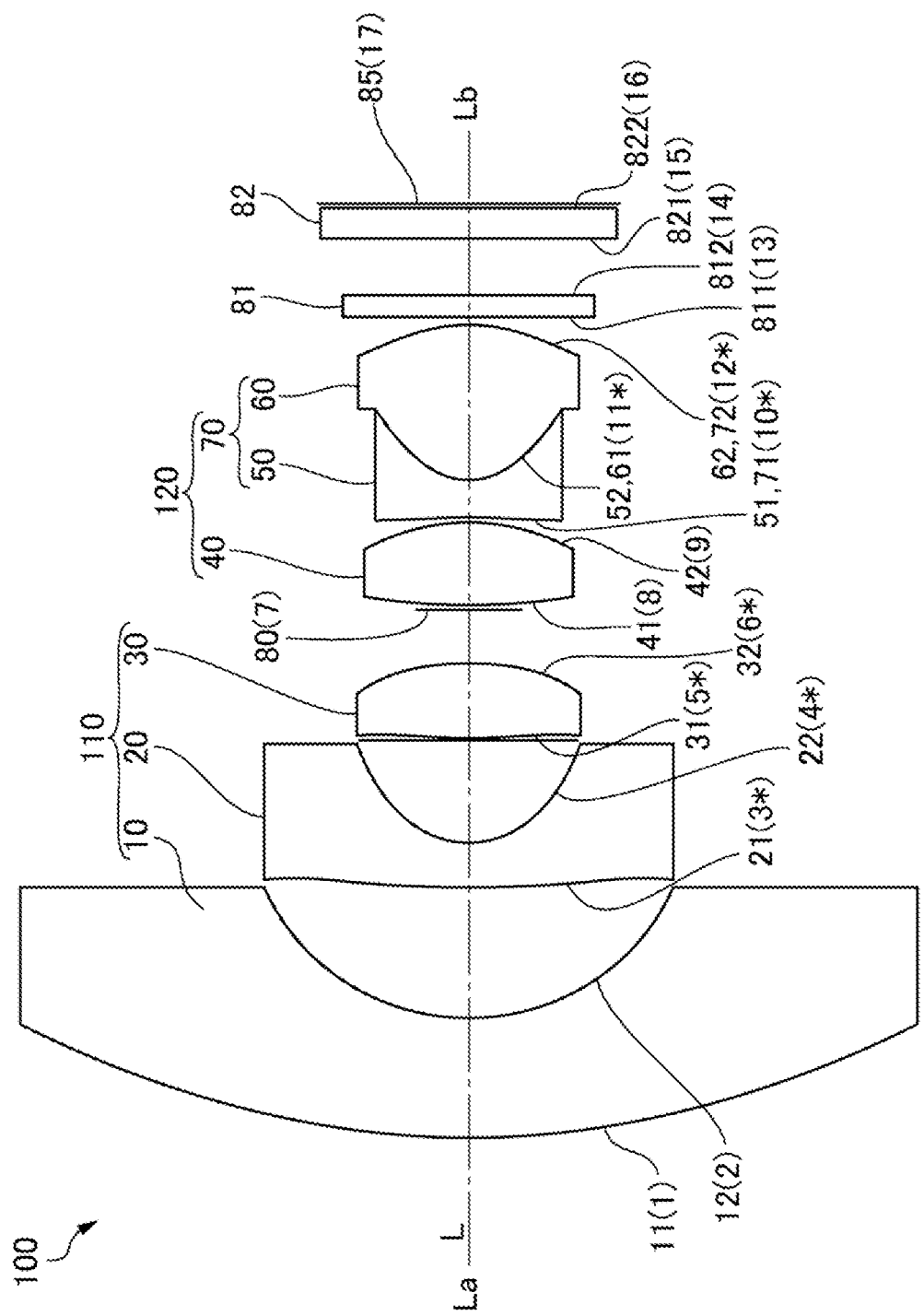
FIG. 11 is an explanatory view of a wide-angle lens according to Embodiment 3 of the present invention.
Figure 12:
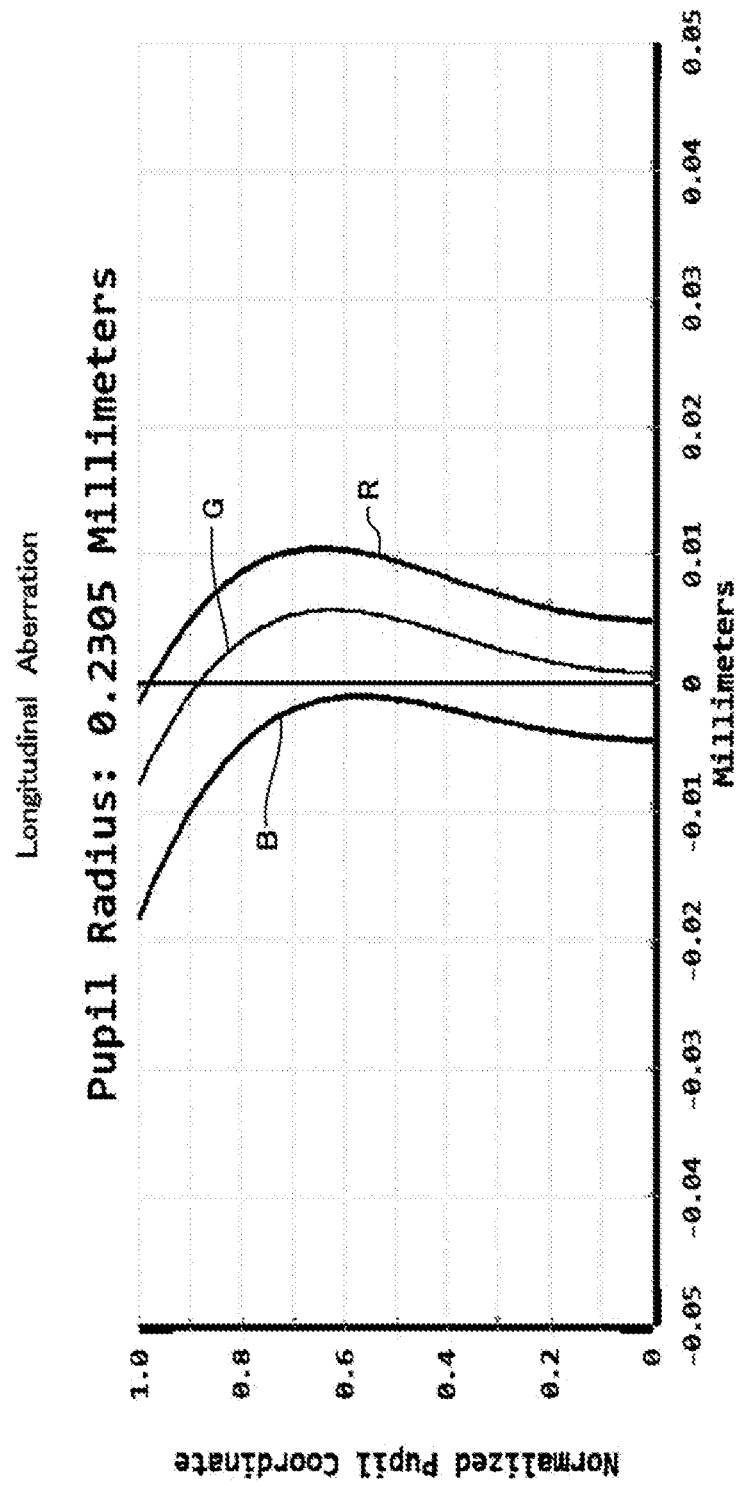
FIG. 12 is an explanatory graph showing a spherical aberration of the wide-angle lens shown in FIG. 11.
Figure 13:
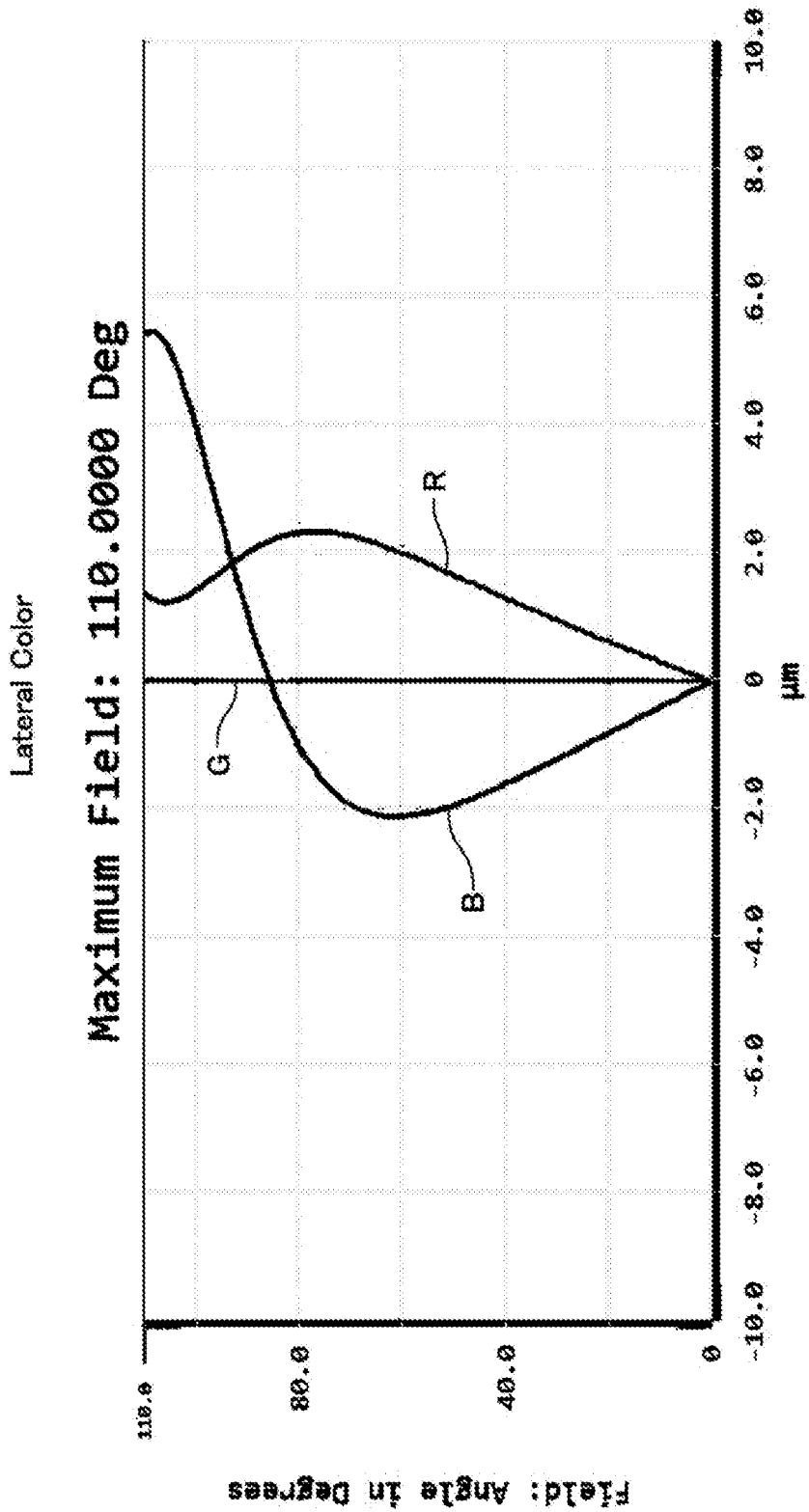
FIG. 13 is an explanatory graph showing a magnification chromatic aberration of the wide-angle lens shown in FIG. 11.
Figure 14:
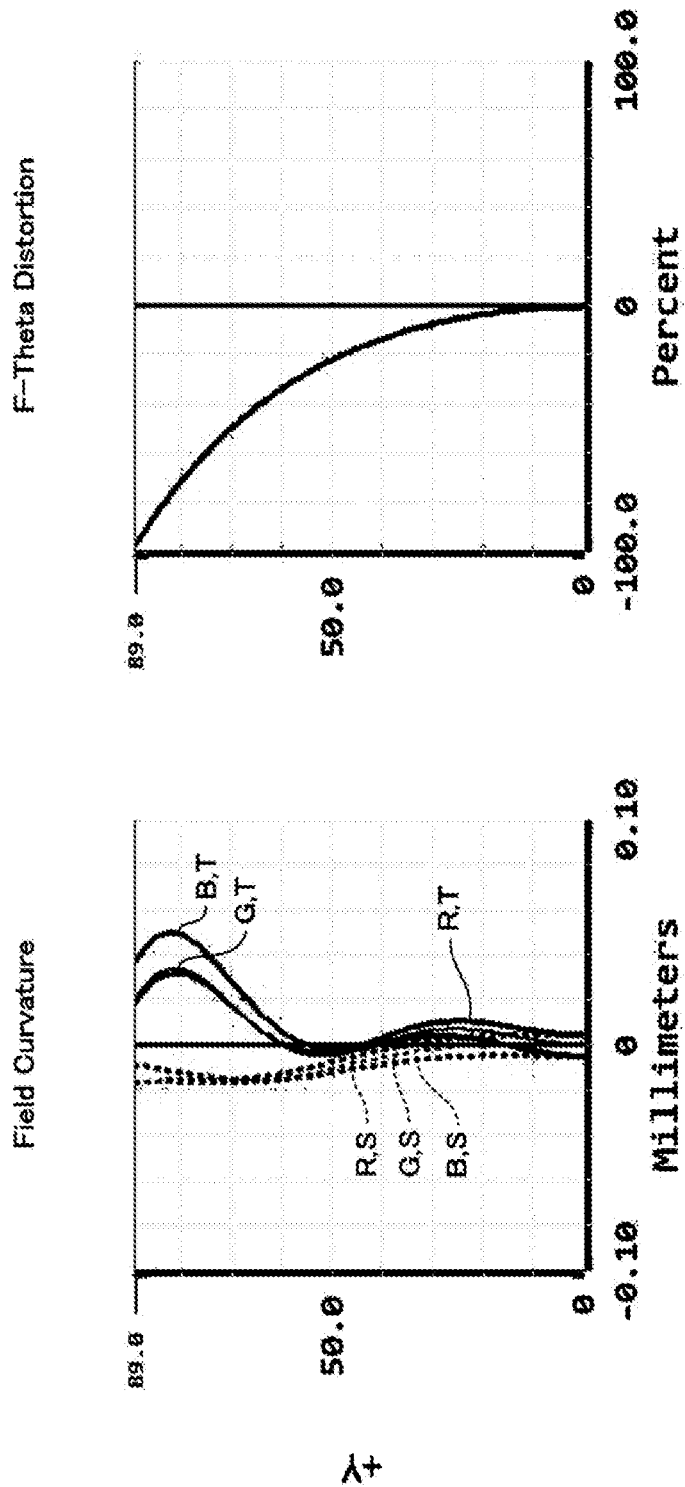
FIG. 14 is an explanatory graph showing astigmatism and distortion of the wide-angle lens shown in FIG. 11.
Figure 15:
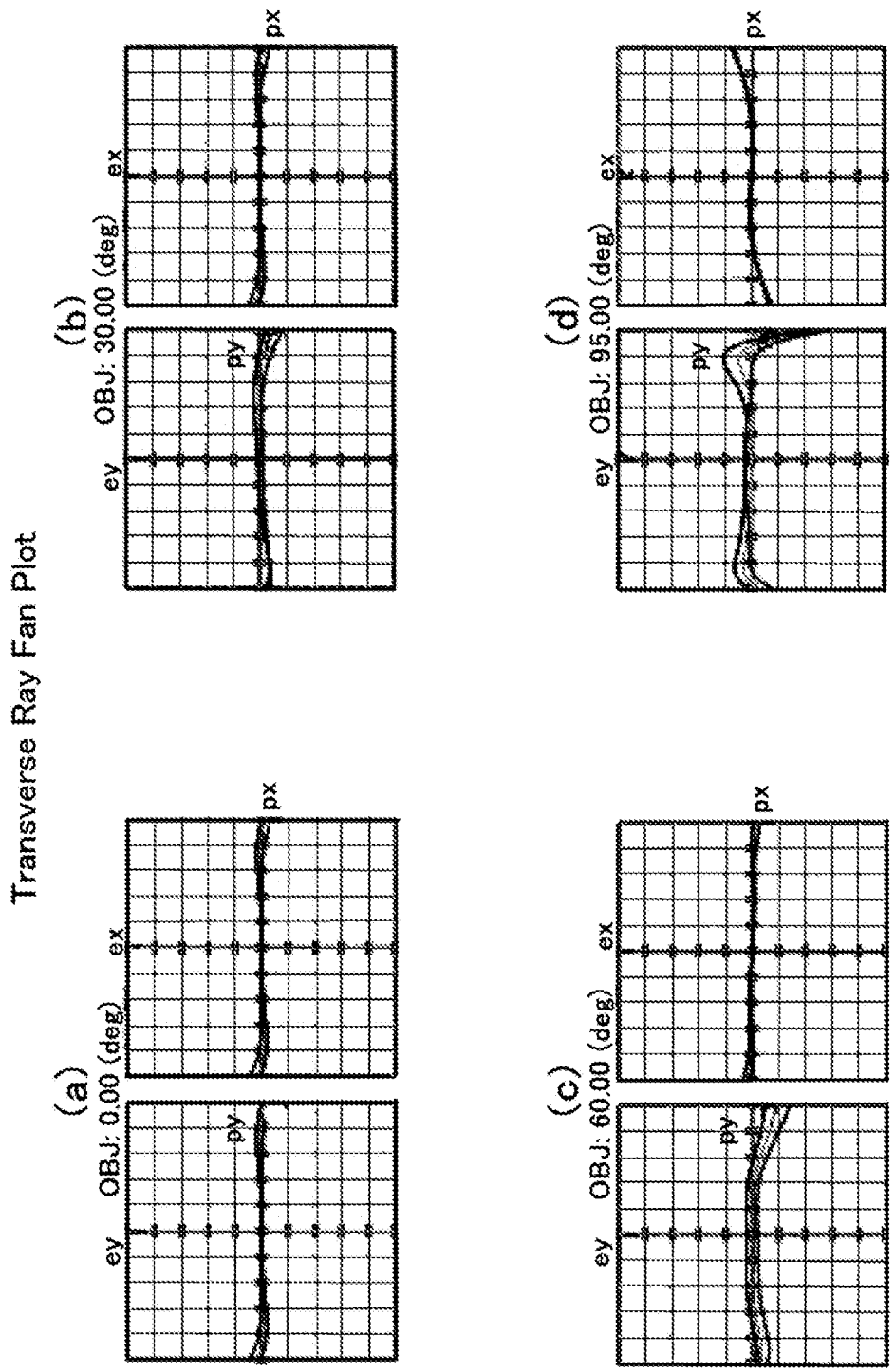
FIG. 15 is an explanatory graph showing a lateral aberration of the wide-angle lens shown in FIG. 11.

FIG. 11 is an explanatory view of the wide-angle lens 100 according to Embodiment 3 of the present invention. FIG. 12 is an explanatory graph showing a spherical aberration of the wide-angle lens 100 shown in FIG. 11. FIG. 13 is an explanatory graph showing a magnification chromatic aberration of the wide-angle lens 100 shown in FIG. 11, and shows a magnification chromatic aberration at the maximum field angle (100.000 deg/half angle). FIG. 14 is an explanatory graph showing astigmatism and distortion of the wide-angle lens 100 shown in FIG. 11. FIG. 15 is an explanatory graph showing a lateral aberration of the wide-angle lens 100 shown in FIG. 11, and FIGS. 15(a), 15(b), 15(c), and 15(d) show the lateral aberration in the tangential direction (Y direction) and the sagittal direction (X direction) at angles of 0°, 30°, 60°, and 95° formed with respect to the optical axis.

As shown in FIG. 11, similarly to Embodiment 1, the wide-angle lens 100 of this embodiment also has the front group 110, the aperture 80, the rear group 120, and the infrared cut filter 81 disposed in order from the object side La to the image side Lb. The front group 110 includes the first lens 10, the second lens 20, and the third lens 30 disposed from the most object side La to the image side Lb. The rear group 120 includes the fourth lens 40, the fifth lens 50, and the sixth lens 60 disposed from the object side La to the image side Lb.

Configuration and the like of each lens of the wide-angle lens 100 of this embodiment is as shown in Table 4. In the wide-angle lens 100 of this embodiment, the focal length f0 of the entire lens system is 0.922 mm, the total length, which is the distance from the lens surface 11 of the first lens 10 to the imaging element 85, is 12.501 mm, the F-value of the entire lens system is 2.0, and the half angle of view is 100 deg. As shown in FIGS. 12 to 15, spherical aberration, magnification chromatic aberration, astigmatism (distortion) and lateral aberration are corrected to an appropriate level in the wide-angle lens 100 of this embodiment.

TABLE 4

| | Effective Focal Length f0 | | | | | 0.922 mm | | | | |
|---|---|---|---|---|---|---|---|---|---|---|
| | Total Track d0 | | | | | 12.501 mm | | | | |
| | Image Space F/# | | | | | 2.00 | | | | |
| | Half Field of Angle | | | | | 100 deg | | | | |

| Surf | Radius | Thickness | Nd | vd | Diameter | Sag | f | f | f | f |
|---|---|---|---|---|---|---|---|---|---|---|
| 1 | 12.330 | 1.600 | 1.871 | 40.5 | 11.975 | 1.551 | −4.982 | −1.251 | −28.376 | |
| 2 | 3.015 | 1.761 | | | 5.474 | 1.750 | | | | |
| 3* | 24.075 | 0.600 | 1.544 | 56.4 | 5.474 | 0.089 | −2.299 | | | |
| 4* | 1.179 | 1.392 | | | 2.996 | 1.307 | | | | |
| 5* | 15.211 | 1.000 | 1.635 | 24.2 | 2.979 | 0.053 | 3.789 | 2.041 | | 2.591 |
| 6* | −2.785 | 0.700 | | | 2.922 | −0.397 | | | | |
| 7(stop) | Infinity | 0.068 | | | | | | | | |
| 8 | 9.337 | 1.100 | 1.804 | 46.3 | 2.800 | 0.106 | 2.848 | | 2.665 | |
| 9 | −2.876 | 0.069 | | | 2.800 | −0.364 | | | | |
| 10* | −26.340 | 0.500 | 1.635 | 24.2 | 2.026 | −0.045 | −1.364 | 5.460 | | |
| 11* | 0.902 | 2.072 | 1.544 | 56.4 | 2.507 | 0.935 | 1.531 | | | |
| 12* | −2.071 | 0.100 | | | 2.940 | −0.395 | | | | |
| 13 | Infinity | 0.300 | | | | | | | | |
| 14 | Infinity | 0.769 | | | | | | | | |
| 15 | Infinity | 0.400 | | | | | | | | |
| 16 | Infinity | 0.070 | | | | | | | | |

| Surf | c (1/Radius) | K | A4 | A6 | A8 | A10 |
|---|---|---|---|---|---|---|
| 3 | 4.15364E−02 | 0.00000E+00 | 8.38266E−03 | −1.82788E−03 | −1.19452E−06 | 2.01383E−05 |
| 4 | 8.48515E−01 | −1.00000E+00 | 4.92396E−02 | 4.54456E−03 | 1.36891E−02 | −6.12468E−03 |
| 5 | 6.57406E−02 | 0.00000E+00 | −1.24973E−02 | 4.86594E−03 | 1.02227E−03 | −7.37367E−04 |
| 6 | −3.59067E−01 | 0.00000E+00 | 3.94928E−03 | 3.77506E−03 | −1.95084E−03 | −8.54624E−05 |
| 10 | −3.79649E−02 | 0.00000E+00 | −2.55362E−02 | 3.01286E−04 | 1.14257E−02 | −2.00761E−02 |
| 11 | 1.10876E+00 | −1.00000E+00 | 6.60016E−02 | −4.03158E−02 | −8.03035E−03 | 1.76654E−02 |
| 12 | −4.82893E−01 | −1.00000E+00 | 3.28070E−02 | −2.02456E−02 | 1.81197E−02 | −6.95663E−03 |

As shown in Table 2, the wide-angle lens 100 of this embodiment satisfies the conditional expressions (1), (2), (3), (4), (5), (6), (7), (8), (9), (10), and (11) described in Embodiment 1, and thus has the same effect as Embodiment 1.

More specifically, the central thickness T1 in the optical axis direction of the first lens 10 is 1.600 mm, and the focal length f0 of the entire lens system is 0.922 mm. Therefore, the ratio (T1/f0) is 1.736, which satisfies the conditional expression (1) and the conditional expression (1a).

More specifically, Sag31 is 0.053 mm and D31 is 2.979 mm. Therefore, the absolute value of the ratio (Sag31/(D31/2)) is 0.035, which satisfies the conditional expression (2).

More specifically, the focal length f0 of the entire lens system is 0.922 mm, and the focal length f1 of the first lens 10 is −4.982 mm. Therefore, the ratio (MO) is −5.404, which satisfies the conditional expression (3).

More specifically, the focal length f1 of the first lens 10 is −4.982 mm and the focal length f2 of the second lens 20 is −2.299 mm. Therefore, the ratio (f1/f2) is 2.166, which satisfies the conditional expression (4).

More specifically, the focal length f0 of the entire lens system is 0.922 mm, and the focal length f3 of the third lens 30 is 3.789 mm. Therefore, the ratio (f3/f0) is 4.110, which satisfies the conditional expression (5).

More specifically, the focal length f0 of the entire lens system is 0.922 mm, and the focal length f2 of the second lens 20 is −2.299 mm. Therefore, the ratio (f2/f0) is −2.494, which satisfies the conditional expression (6).

More specifically, the focal length f0 of the entire lens system is 0.922 mm, and the focal length f4 of the fourth lens 40 is 2.848 mm. Therefore, the ratio (f4/f0) is 3.090, which satisfies the conditional expression (7).

More specifically, the focal length f0 of the entire lens system is 0.922 mm, and the composite focal length f456 of the fourth lens 40, the fifth lens 50, and the sixth lens 60 is 2.665 mm. Therefore, the ratio (f456/f0) is 2.891, which satisfies the conditional expression (8).

More specifically, the focal length f0 of the entire lens system is 0.922 mm, and the composite focal length f56 of the fifth lens 50 and the sixth lens 60 is 5.460 mm. Therefore, the ratio (f56/f0) is 5.923, which satisfies the conditional expression (9).

More specifically, the focal length f0 of the entire lens system is 0.922 mm, and the radius of curvature R42 on the optical axis of the lens surface 42 on the image side Lb of the fourth lens 40 is −2.876 mm. Therefore, the ratio (R42/f0) is −3.120, which satisfies the conditional expression (10).

More specifically, the object-image distance d0 of the entire lens system is 12.501 mm, and the focal length f0 of the entire lens system is 0.922 mm. Therefore, the ratio (d0/f0) is 13.560, which satisfies the conditional expression (11).

Embodiment 4

Figure 16:
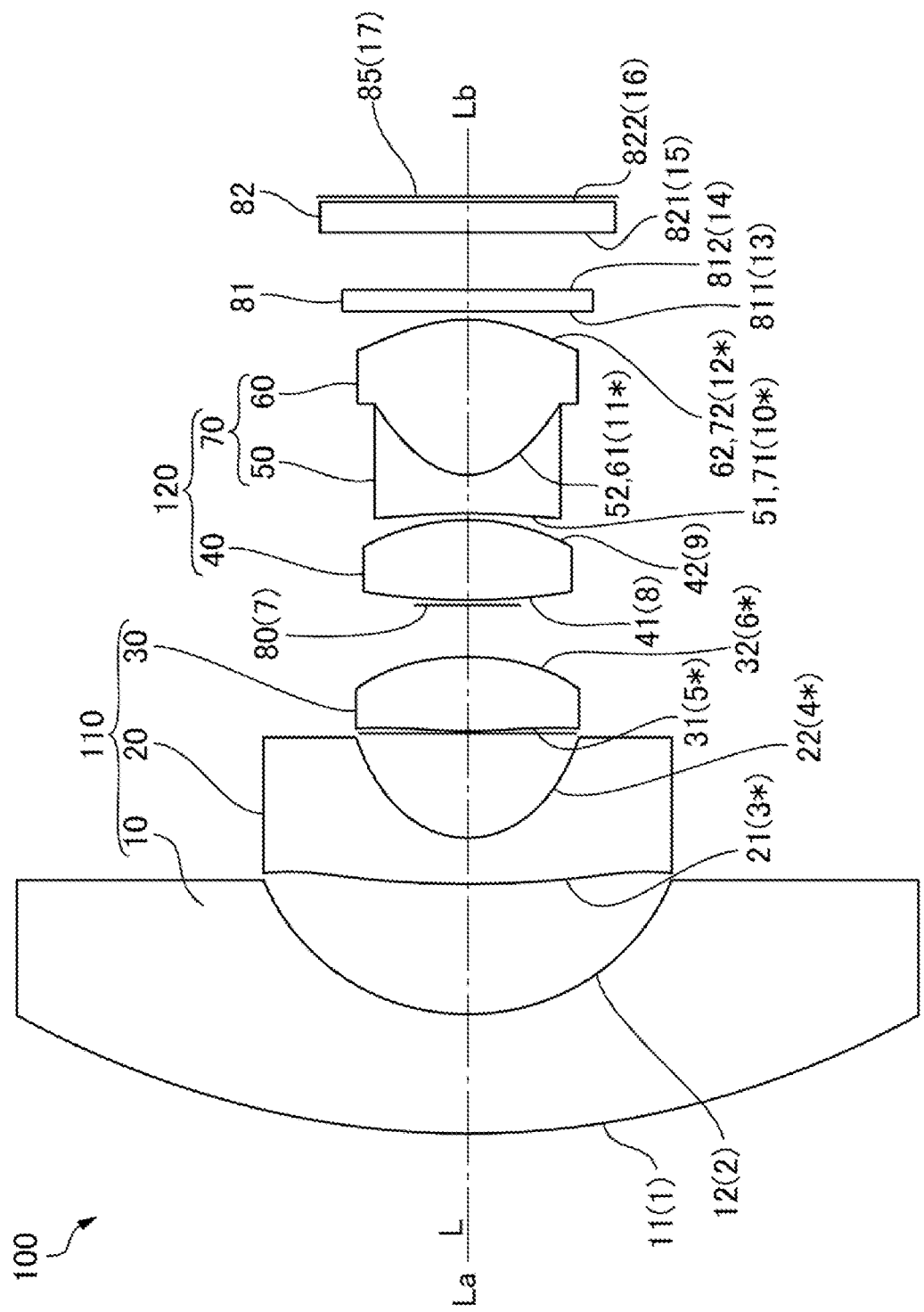
FIG. 16 is an explanatory view of a wide-angle lens according to Embodiment 4 of the present invention.
Figure 17:
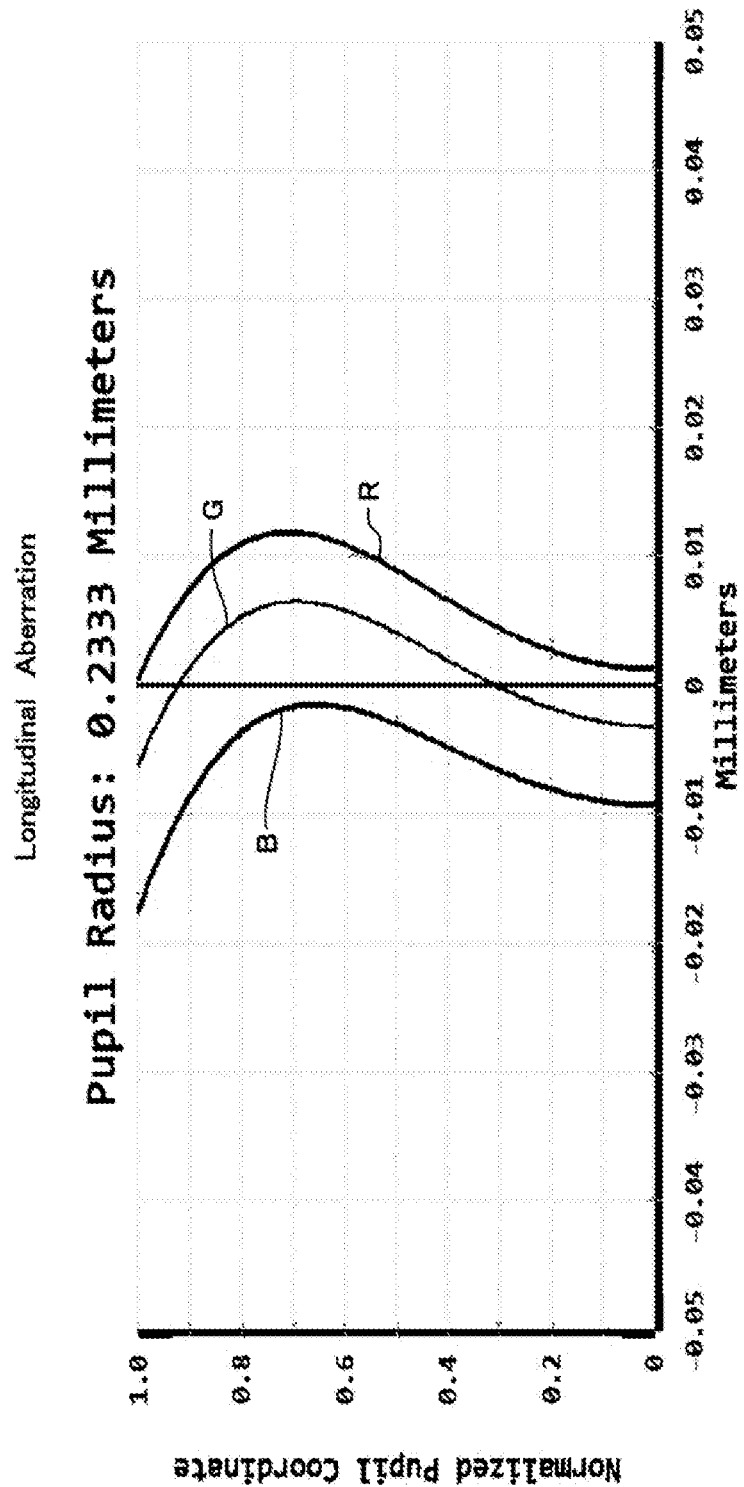
FIG. 17 is an explanatory graph showing a spherical aberration of the wide-angle lens shown in FIG. 16.
Figure 18:
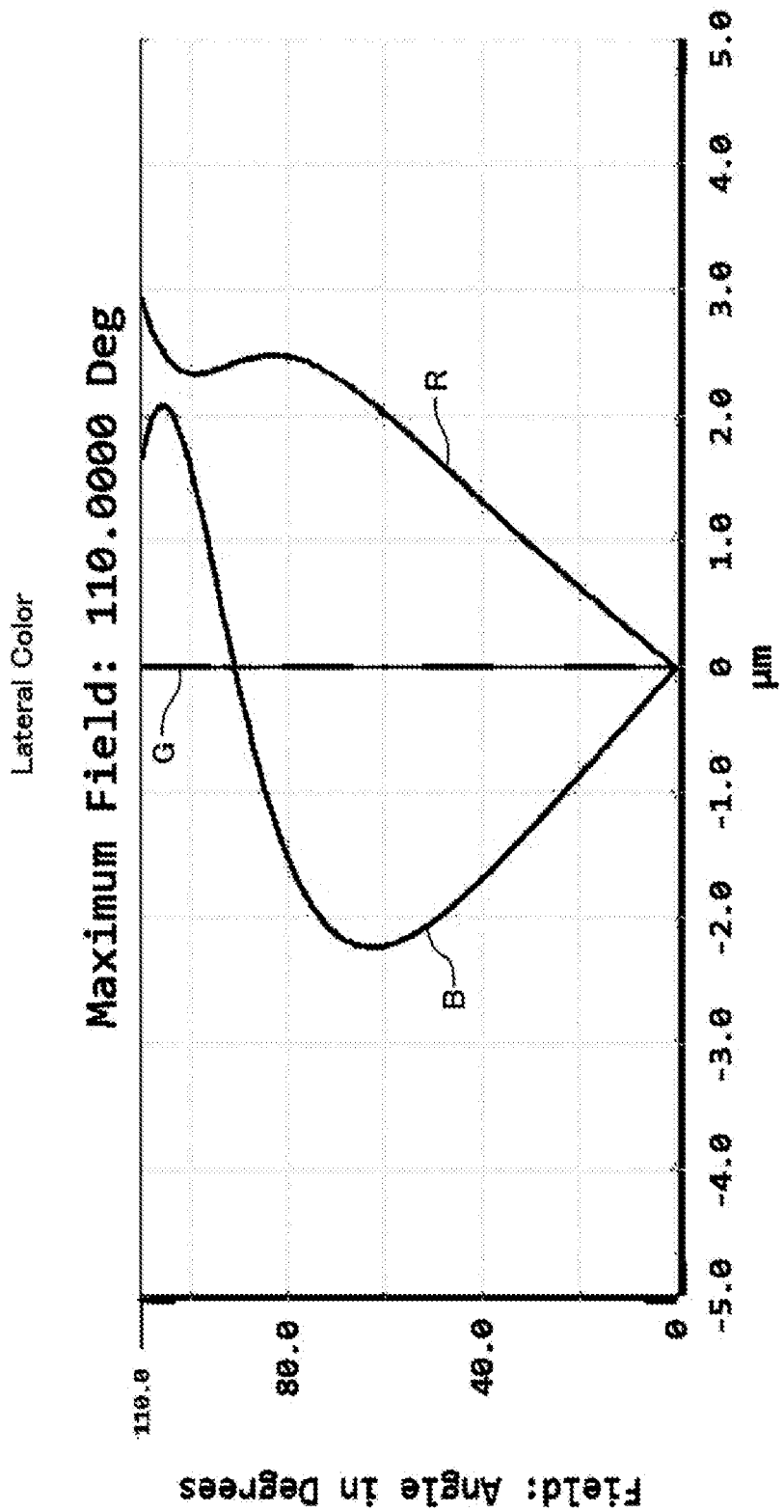
FIG. 18 is an explanatory graph showing a magnification chromatic aberration of the wide-angle lens shown in FIG. 16.
Figure 19:
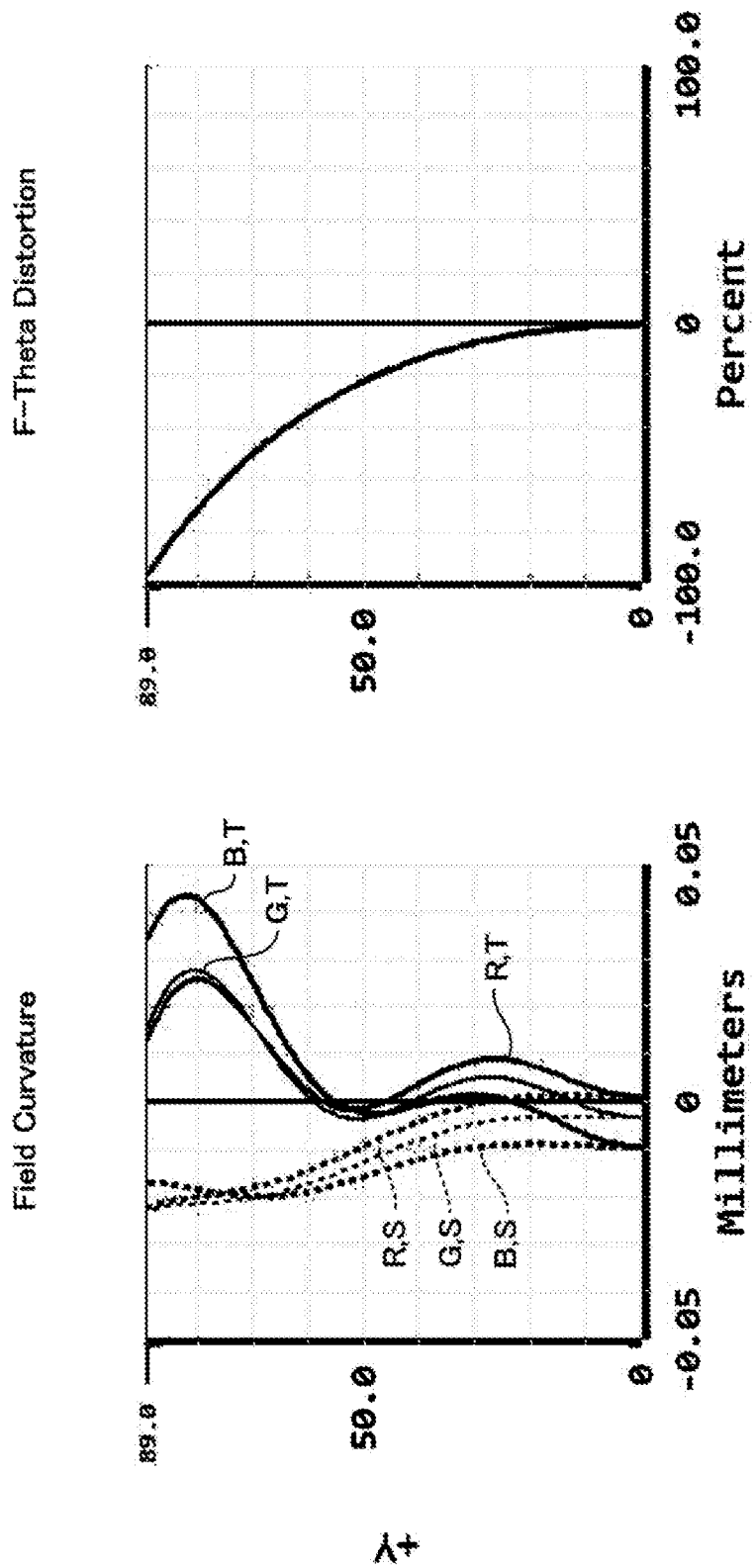
FIG. 19 is an explanatory graph showing astigmatism and distortion of the wide-angle lens shown in FIG. 16.
Figure 20:
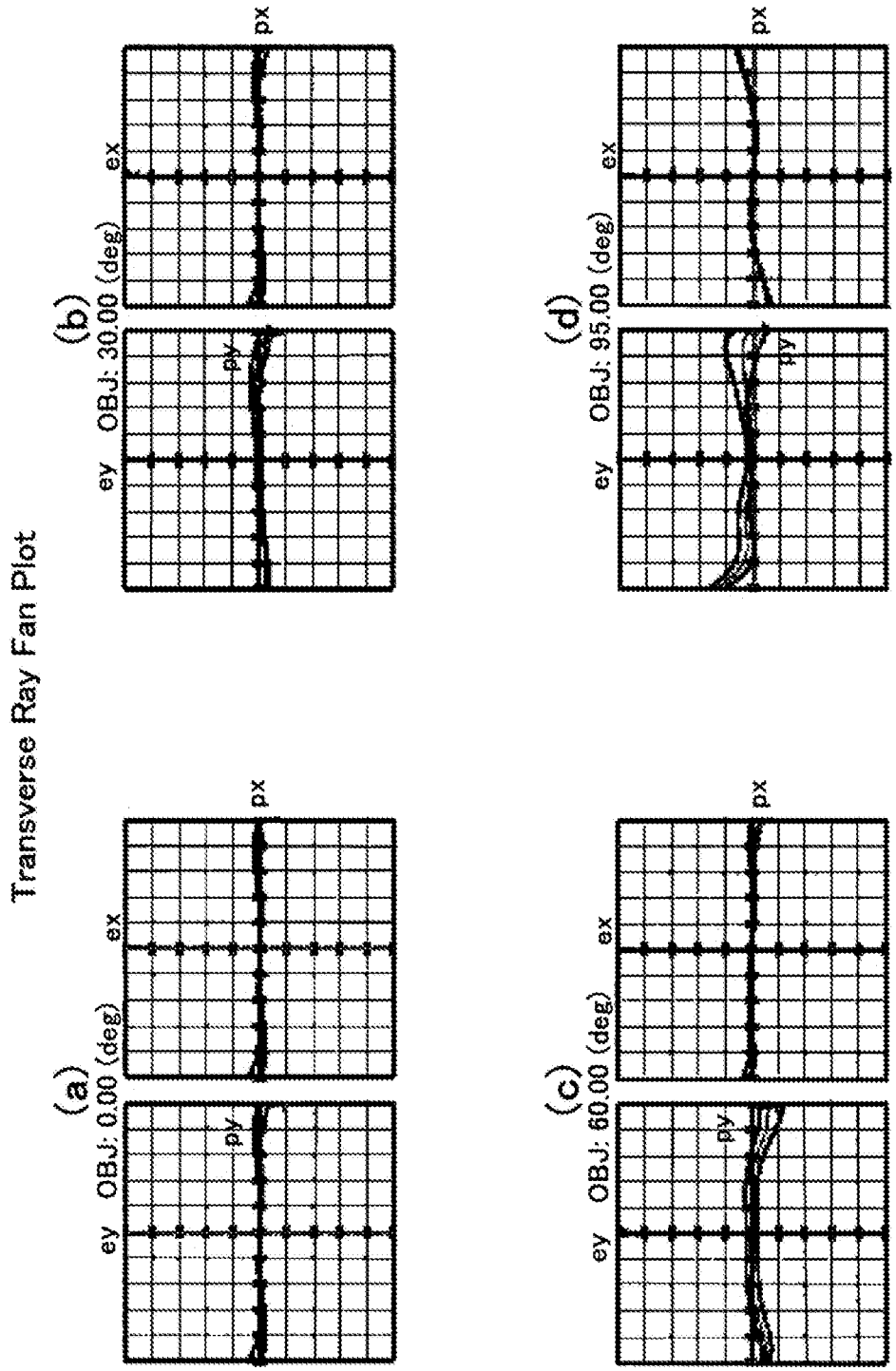
FIG. 20 is an explanatory graph showing a lateral aberration of the wide-angle lens shown in FIG. 16.

FIG. 16 is an explanatory view of the wide-angle lens 100 according to Embodiment 4 of the present invention. FIG. 17 is an explanatory graph showing a spherical aberration of the wide-angle lens 100 shown in FIG. 16. FIG. 18 is an explanatory graph showing a magnification chromatic aberration of the wide-angle lens 100 shown in FIG. 16, showing the magnification chromatic aberration at the maximum angle of view (110.000 deg/half angle). FIG. 19 is an explanatory graph showing astigmatism and distortion of the wide-angle lens 100 shown in FIG. 16. FIG. 20 is an explanatory graph showing a lateral aberration of the wide-angle lens 100 shown in FIG. 16, and FIGS. 20(a), 20(b), 20(c), and 20(d) show the lateral aberration in the tangential direction (Y direction) and the sagittal direction (X direction) at angles of 0°, 30°, 60°, and 95° formed with respect to the optical axis.

As shown in FIG. 16, similarly to Embodiment 1, the wide-angle lens 100 of this embodiment also has the front group 110, the aperture 80, the rear group 120, and the infrared cut filter 81 disposed in order from the object side La to the image side Lb. The front group 110 includes the first lens 10, the second lens 20, and the third lens 30 disposed from the most object side La to the image side Lb. The rear group 120 includes the fourth lens 40, the fifth lens 50, and the sixth lens 60 disposed from the object side La to the image side Lb.

Configuration and the like of each lens of the wide-angle lens 100 of this embodiment is as shown in Table 5. In the wide-angle lens 100 of this embodiment, the focal length f0 of the entire lens system is 0.933 mm, the total length, which is the distance from the lens surface 11 of the first lens 10 to the imaging element 85, is 12.500 mm, the F-value of the entire lens system is 2.0, and the half angle of view is 110 deg. As shown in FIGS. 17 to 20, spherical aberration, magnification chromatic aberration, astigmatism (distortion) and lateral aberration are corrected to an appropriate level in the wide-angle lens 100 of this embodiment.

10 is −4.892 mm. Therefore, the ratio (f1/f0) is −5.242, which satisfies the conditional expression (3).

More specifically, the focal length f1 of the first lens 10 is −4.892 mm and the focal length f2 of the second lens 20 is −2.355 mm. Therefore, the ratio (f1/f2) is 2.077, which satisfies the conditional expression (4).

More specifically, the focal length f0 of the entire lens system is 0.933 mm, and the focal length f3 of the third lens 30 is 3.779 mm. Therefore, the ratio (f3/f0) is 4.050, which satisfies the conditional expression (5).

More specifically, the focal length f0 of the entire lens system is 0.933 mm, and the focal length f2 of the second lens 20 is −2.355 mm. Therefore, the ratio (f2/f0) is −2.524, which satisfies the conditional expression (6).

More specifically, the focal length f0 of the entire lens system is 0.933 mm, and the focal length f4 of the fourth lens 40 is 2.863 mm. Therefore, the ratio (f4/f0) is 3.068, which satisfies the conditional expression (7).

More specifically, the focal length f0 of the entire lens system is 0.933 mm, and the composite focal length f456 of the fourth lens 40, the fifth lens 50, and the sixth lens 60 is

TABLE 5

| | Effective Focal Length f0 | | | | | 0.933 mm | | | |
|---|---|---|---|---|---|---|---|---|---|
| | Total Track d0 | | | | | 12.500 mm | | | |
| | Image Space F/# | | | | | 2.00 | | | |
| | Half Field of Angle | | | | | 110 deg | | | |
| Surf | Radius | Thickness | Nd | vd | Diameter | Sag | f | f | f | f |
| 1 | 12.245 | 1.567 | 1.871 | 40.5 | 12.003 | 1.572 | −4.892 | −1.258 | −40.513 | |
| 2 | 2.972 | 1.785 | | | 5.459 | 1.796 | | | | |
| 3* | 22.833 | 0.600 | 1.544 | 56.4 | 5.459 | 0.108 | −2.355 | | | |
| 4* | 1.202 | 1.406 | | | 2.991 | 1.322 | | | | |
| 5* | 15.209 | 1.000 | 1.635 | 24.2 | 2.984 | 0.054 | 3.779 | 2.036 | | 2.571 |
| 6* | −2.776 | 0.682 | | | 2.972 | −0.418 | | | | |
| 7(stop) | Infinity | 0.065 | | | | | | | | |
| 8 | 9.310 | 1.100 | 1.804 | 46.3 | 2.800 | 0.106 | 2.863 | | 2.710 | |
| 9 | −2.898 | 0.067 | | | 2.800 | −0.361 | | | | |
| 10* | −26.257 | 0.500 | 1.635 | 24.2 | 2.032 | −0.045 | −1.374 | 5.833 | | |
| 11* | 0.909 | 2.084 | 1.544 | 56.4 | 2.527 | 0.957 | 1.546 | | | |
| 12* | −2.158 | 0.100 | | | 2.966 | −0.385 | | | | |
| 13 | Infinity | 0.300 | | | | | | | | |
| 14 | Infinity | 0.774 | | | | | | | | |
| 15 | Infinity | 0.400 | | | | | | | | |
| 16 | Infinity | 0.070 | | | | | | | | |

| Surf | c (1/Radius) | K | A4 | A6 | A8 | A10 |
|---|---|---|---|---|---|---|
| 3 | 4.37961E−02 | 0.00000E+00 | 8.33139E−03 | −1.80958E−03 | 3.72217E−06 | 2.03431E−05 |
| 4 | 8.32184E−01 | −1.00000E+00 | 5.06134E−02 | 5.11206E−03 | 1.43285E−02 | −5.98319E−03 |
| 5 | 6.57486E−02 | 0.00000E+00 | −1.10084E−02 | 4.73599E−03 | 1.26986E−03 | −8.84471E−04 |
| 6 | −3.60205E−01 | 0.00000E+00 | 5.07709E−03 | 3.62562E−03 | −2.07080E−03 | −2.40870E−05 |
| 10 | −3.80856E−02 | 0.00000E+00 | −2.52681E−02 | 1.21462E−03 | 1.15418E−02 | −1.90604E−02 |
| 11 | 1.10021E+00 | −1.00000E+00 | 6.85707E−02 | −3.26943E−02 | −4.13996E−03 | 1.39510E−02 |
| 12 | −4.63449E−01 | −1.00000E+00 | 3.27124E−02 | −2.09426E−02 | 1.79191E−02 | −6.95049E−03 |

As shown in Table 2, the wide-angle lens 100 of this embodiment satisfies the conditional expressions (1), (2), (3), (4), (5), (6), (7), (8), (9), (10), and (11) described in Embodiment 1, and thus has the same effect as Embodiment 1.

More specifically, the central thickness T1 in the optical axis direction of the first lens 10 is 1.567 mm, and the focal length f0 of the entire lens system is 0.933 mm. Therefore, the ratio (T1/f0) is 1.680, which satisfies the conditional expression (1) and the conditional expression (1a).

More specifically, Sag31 is 0.054 mm and D31 is 2.984 mm. Therefore, the absolute value of the ratio (Sag31/(D31/2)) is 0.036, which satisfies the conditional expression (2).

More specifically, the focal length f0 of the entire lens system is 0.933 mm, and the focal length f1 of the first lens 2.710 mm. Therefore, the ratio (f456/f0) is 2.904, which satisfies the conditional expression (8).

More specifically, the focal length f0 of the entire lens system is 0.933 mm, and the composite focal length f56 of the fifth lens 50 and the sixth lens 60 is 5.833 mm. Therefore, the ratio (f56/f0) is 6.251, which satisfies the conditional expression (9).

More specifically, the focal length f0 of the entire lens system is 0.933 mm, and the radius of curvature R42 on the optical axis of the lens surface 42 on the image side Lb of the fourth lens 40 is −2.898 mm. Therefore, the ratio (R42/f0) is −3.105, which satisfies the conditional expression (10).

More specifically, the object-image distance d0 of the entire lens system is 12.500 mm, and the focal length f0 of the entire lens system is 0.933 mm. Therefore, the ratio (d0/f0) is 13.395, which satisfies the conditional expression (11).

Embodiment 5

Figure 21:
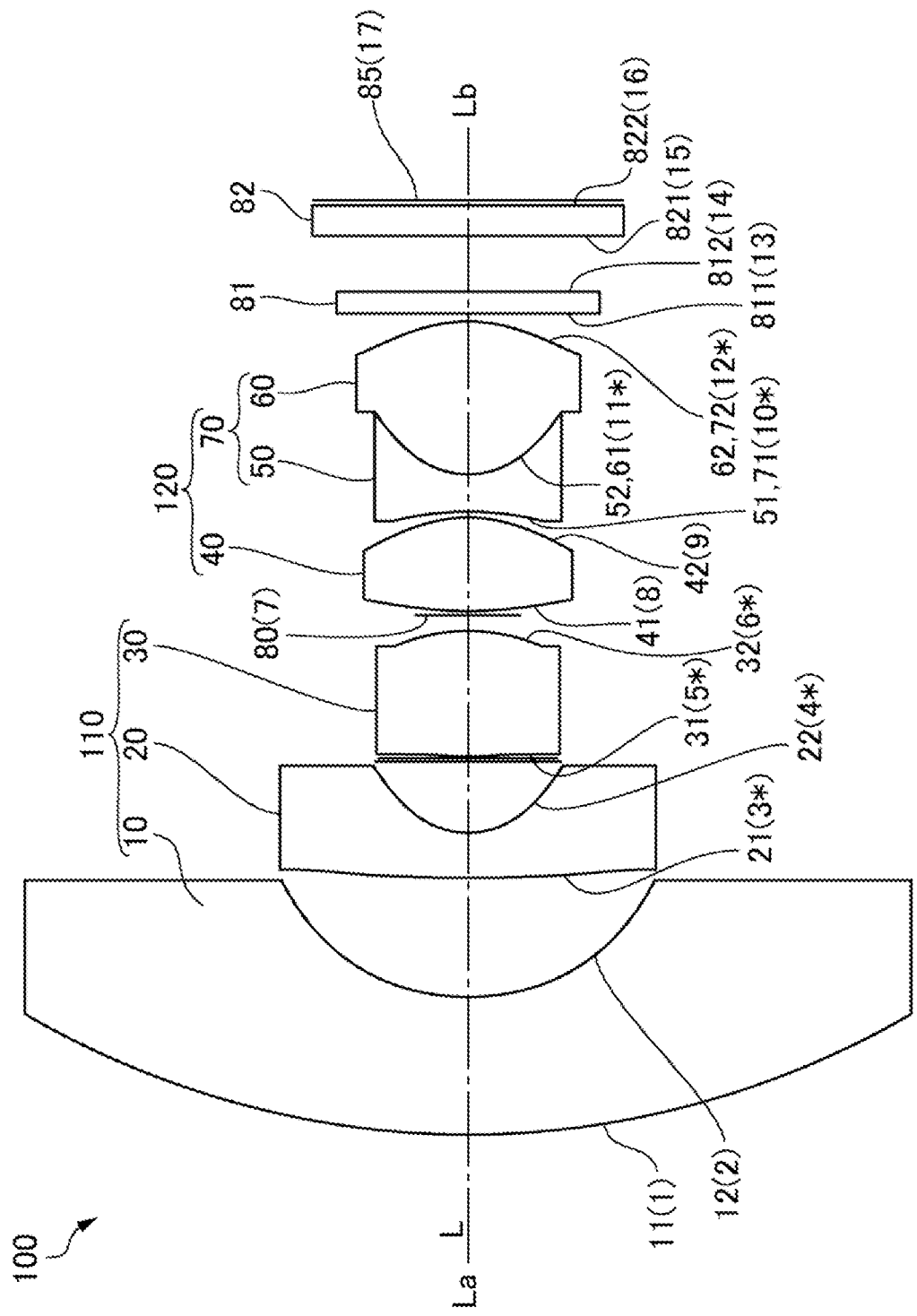
FIG. 21 is an explanatory view of a wide-angle lens according to Embodiment 5 of the present invention.
Figure 22:
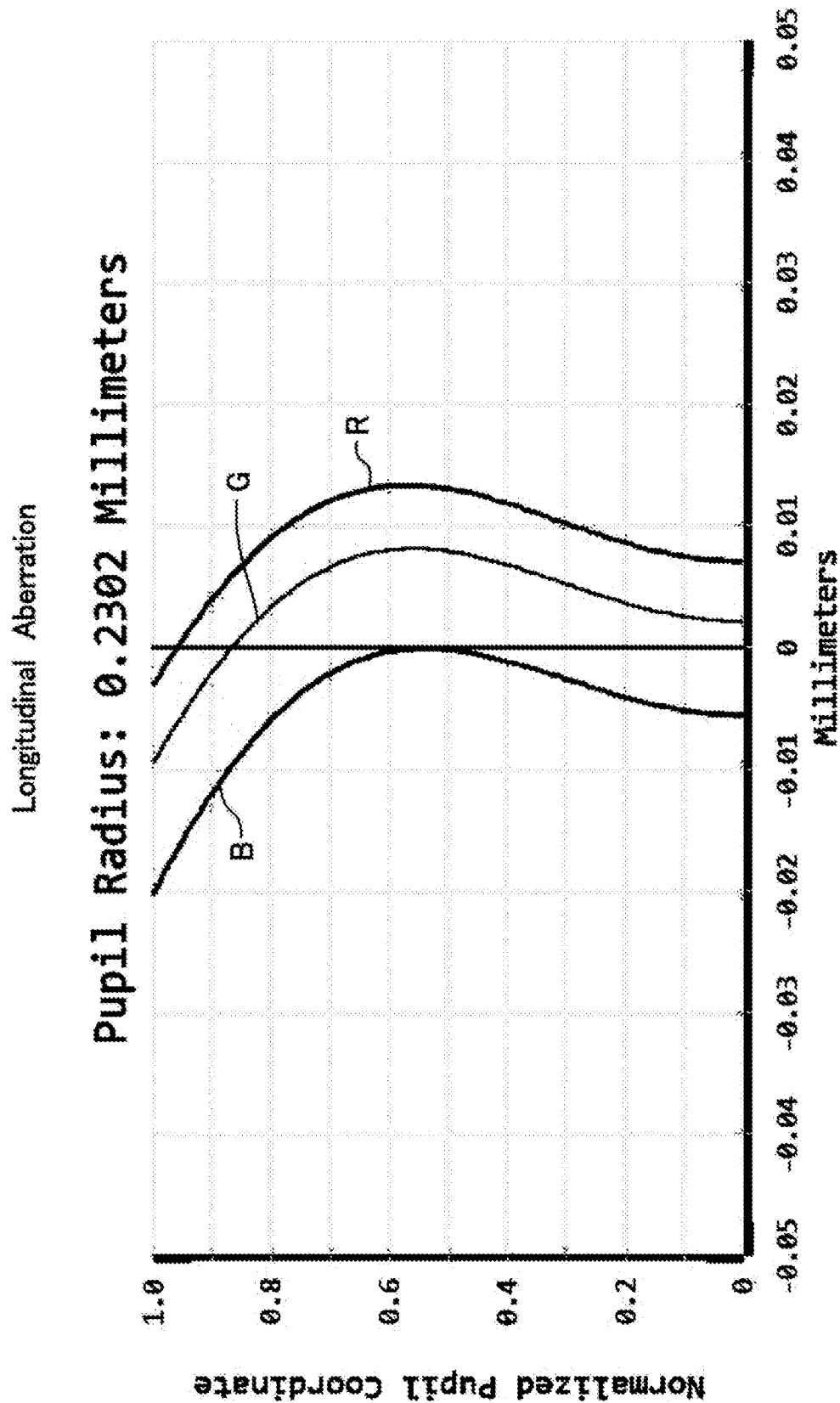
FIG. 22 is an explanatory graph showing a spherical aberration of the wide-angle lens shown in FIG. 21.
Figure 23:
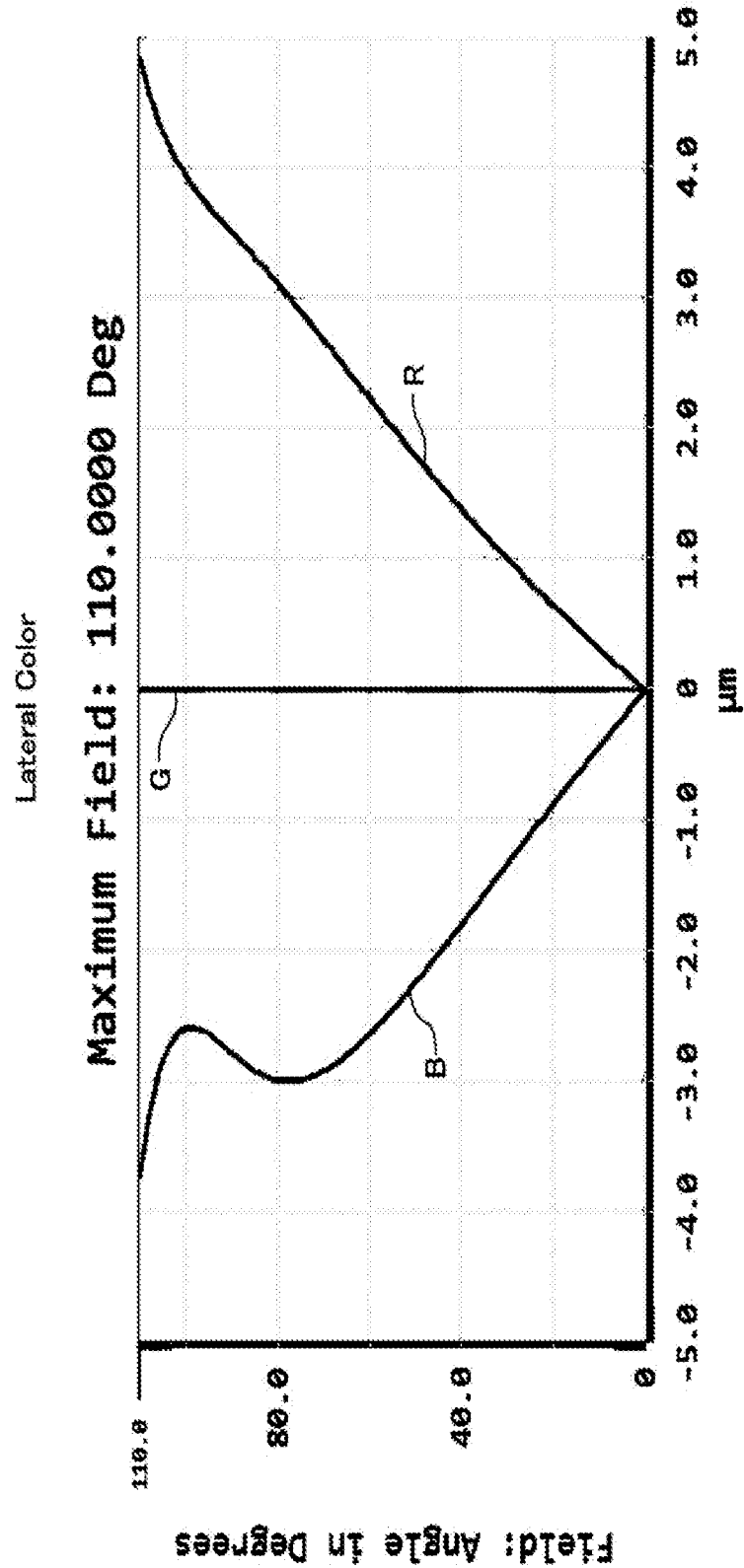
FIG. 23 is an explanatory graph showing a magnification chromatic aberration of the wide-angle lens shown in FIG. 21.
Figure 24:
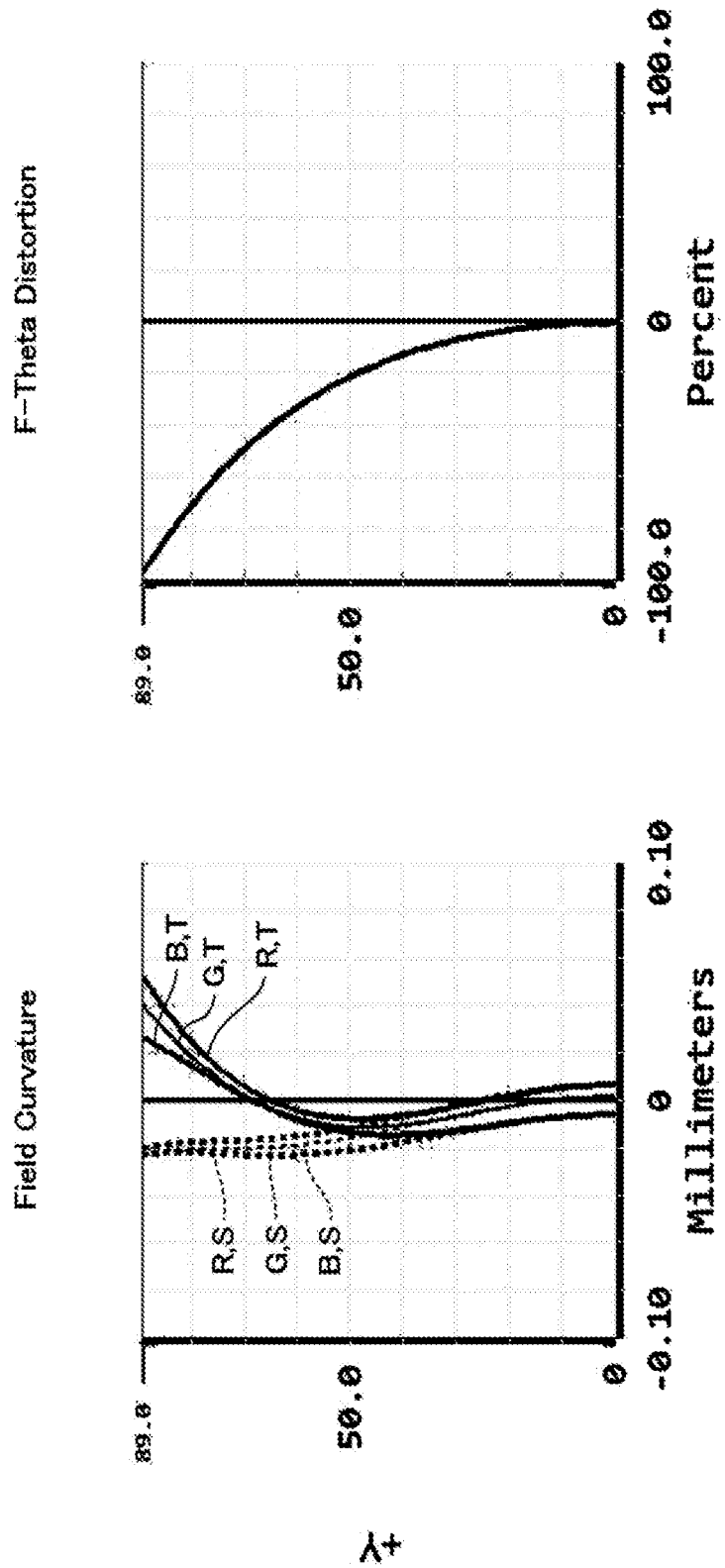
FIG. 24 is an explanatory graph showing astigmatism and distortion of the wide-angle lens shown in FIG. 21.
Figure 25:
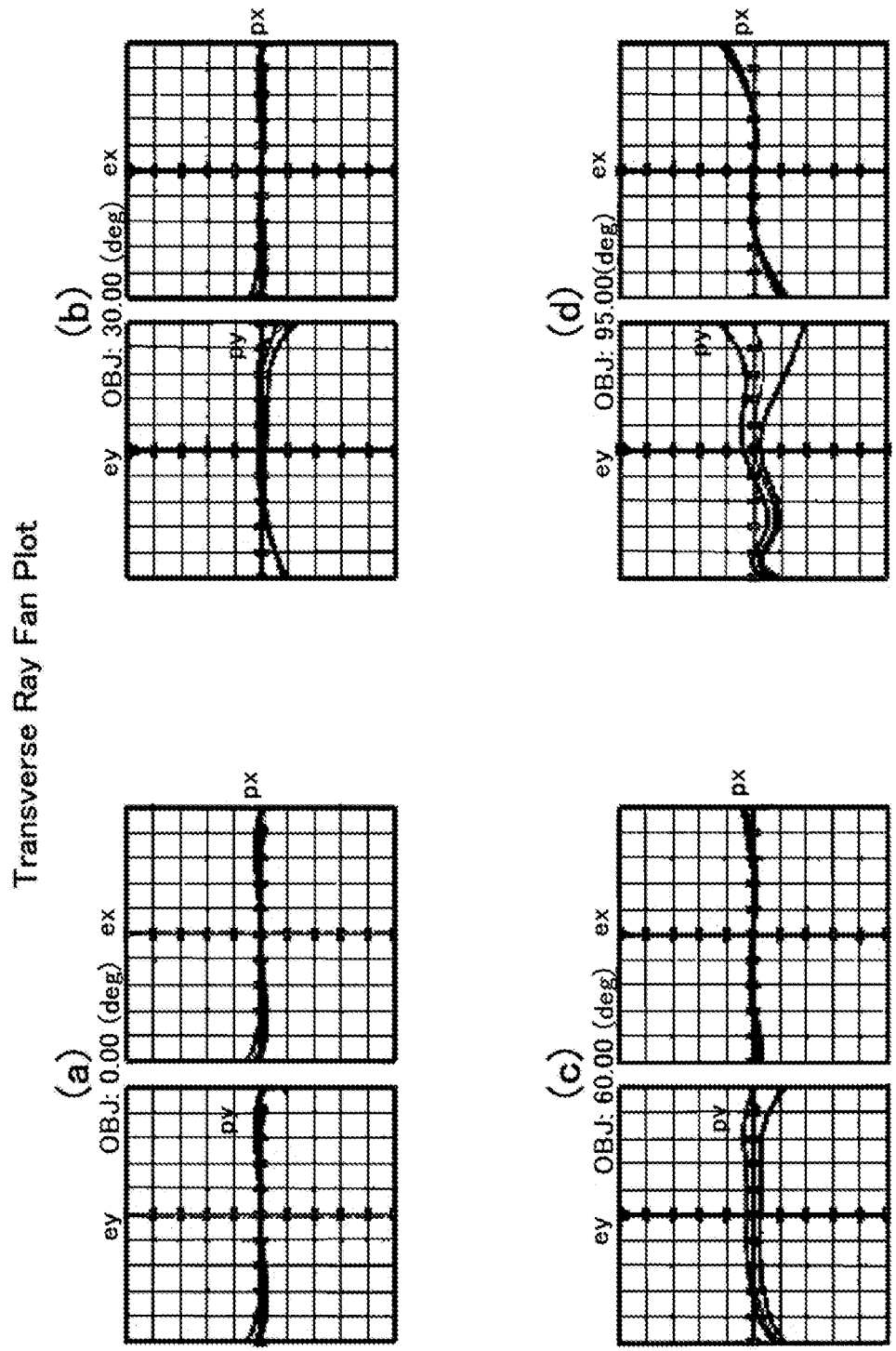
FIG. 25 is an explanatory graph showing a lateral aberration of the wide-angle lens shown in FIG. 21.

FIG. 21 is an explanatory view of a wide-angle lens 100 according to Embodiment 5 of the present invention. FIG. 22 is an explanatory graph showing a spherical aberration of the wide-angle lens 100 shown in FIG. 21. FIG. 23 is an explanatory graph showing a magnification chromatic aberration of the wide-angle lens 100 shown in FIG. 21, showing the magnification chromatic aberration at the maximum angle of view (110.000 deg/half angle). FIG. 24 is an explanatory graph showing astigmatism and distortion of the wide-angle lens 100 shown in FIG. 21. FIG. 25 is an explanatory graph showing a lateral aberration of the wide-angle lens 100 shown in FIG. 21, and FIGS. 25(a), 25(b), 25(c) and 25(d) show the lateral aberration in the tangential direction (Y direction) and the sagittal direction (X direction) at angles of 0°, 30°, 60° and 95° formed with respect to the optical axis.

As shown in FIG. 21, similarly to Embodiment 1, the wide-angle lens 100 of this embodiment also has the front group 110, the aperture 80, the rear group 120, and the infrared cut filter 81 disposed in order from the object side La to the image side Lb. The front group 110 includes the first lens 10, the second lens 20, and the third lens 30 disposed from the most object side La to the image side Lb. The rear group 120 includes the fourth lens 40, the fifth lens 50, and the sixth lens 60 disposed from the object side La to the image side Lb.

Configuration and the like of each lens of the wide-angle lens 100 of this embodiment is as shown in Table 6. In the wide-angle lens 100 of this embodiment, the focal length f0 of the entire lens system is 0.916 mm, the total length, which is the distance from the lens surface 11 of the first lens 10 to the imaging element 85, is 12.500 mm, the F-value of the entire lens system is 1.99, and the half angle of view is 110 deg. As shown in FIGS. 22 to 25, spherical aberration, magnification chromatic aberration, astigmatism (distortion) and lateral aberration are corrected to an appropriate level in the wide-angle lens 100 of this embodiment.

TABLE 6

| | Effective Focal Length f0 | | | | | 0.916 mm | | | | |
| | Total Track d0 | | | | | 12.500 mm | | | | |
| | Image Space F/# | | | | | 1.99 | | | | |
| | Half Field of Angle | | | | | 110 deg | | | | |
| Surf | Radius | Thickness | Nd | vd | Diameter | Sag | f | f | f | f |
|---|---|---|---|---|---|---|---|---|---|---|
| 1 | 11.747 | 1.825 | 1.871 | 40.5 | 11.815 | 1.594 | −4.665 | −1.142 | 27.943 | |
| 2 | 2.800 | 1.610 | | | 5.029 | 1.568 | | | | |
| 3* | 16.372 | 0.600 | 1.544 | 56.4 | 5.029 | 0.100 | −2.060 | | | |
| 4* | 1.035 | 1.031 | | | 2.559 | 0.890 | | | | |
| 5* | 9.056 | 1.657 | 1.635 | 24.2 | 2.447 | −0.003 | 3.268 | 1.812 | | 2.560 |
| 6* | −2.500 | 0.198 | | | 1.995 | −0.206 | | | | |
| 7(stop) | Infinity | 0.080 | | | | | | | | |
| 8 | 6.890 | 1.240 | 1.697 | 46.3 | 2.800 | 0.144 | 2.719 | | 2.738 | |
| 9 | −2.420 | 0.080 | | | 2.800 | −0.446 | | | | |
| 10* | −6.069 | 0.500 | 1.635 | 24.2 | 2.032 | −0.119 | −1.359 | 5.281 | | |
| 11* | 1.038 | 2.039 | 1.544 | 56.4 | 2.569 | 0.846 | 1.624 | | | |
| 12* | −1.824 | 0.100 | | | 3.017 | −0.450 | | | | |
| 13 | Infinity | 0.300 | | | | | | | | |
| 14 | Infinity | 0.770 | | | | | | | | |
| 15 | Infinity | 0.400 | | | | | | | | |
| 16 | Infinity | 0.070 | | | | | | | | |

| Surf | c (1/Radius) | K | A4 | A6 | A8 | A10 |
|---|---|---|---|---|---|---|
| 3 | 6.10810E−02 | 0.00000E+00 | −2.53171E−03 | 3.81158E−05 | −1.57431E−06 | 0.00000E+00 |
| 4 | 9.66071E−01 | −7.19725E−01 | −2.42022E−03 | 2.31813E−03 | −1.86552E−03 | −8.06233E−05 |
| 5 | 1.10424E−01 | 0.00000E+00 | −2.31363E−02 | −1.17825E−02 | 7.06376E−04 | 2.77933E−04 |
| 6 | −3.99990E−01 | 0.00000E+00 | 5.19543E−03 | −8.82307E−03 | 5.90711E−03 | −4.96802E−04 |
| 10 | −1.64759E−01 | 0.00000E+00 | −3.23941E−02 | 9.17858E−04 | −5.78297E−04 | 3.33571E−04 |
| 11 | 9.63063E−01 | −8.37146E−01 | 4.13250E−02 | −5.89492E−02 | 1.98700E−02 | −4.93299E−05 |
| 12 | −5.48099E−01 | −1.19070E+00 | 2.36439E−02 | −4.06015E−04 | 1.37032E−03 | 3.42468E−07 |

As shown in Table 2, the wide-angle lens 100 of this embodiment satisfies the conditional expressions (1), (2), (3), (4), (5), (6), (7), (8), (9), and (11) described in Embodiment 1, and thus has the same effect as Embodiment 1.

More specifically, the central thickness T1 in the optical axis direction of the first lens 10 is 1.825 mm, and the focal length f0 of the entire lens system is 0.916 mm. Therefore, the ratio (T1/f0) is 1.992, which satisfies the conditional expression (1).

More specifically, Sag31 is −0.003 mm and D31 is 2.447 mm. Therefore, the absolute value of the ratio (Sag31/(D31/2)) is 0.002, which satisfies the conditional expression (2).

More specifically, the focal length f0 of the entire lens system is 0.916 mm, and the focal length f1 of the first lens 10 is −4.665 mm. Therefore, the ratio (MO) is −5.092, which satisfies the conditional expression (3).

More specifically, the focal length f1 of the first lens 10 is −4.665 mm and the focal length f2 of the second lens 20 is −2.060 mm. Therefore, the ratio (f1/f2) is 2.265, which satisfies the conditional expression (4).

More specifically, the focal length f0 of the entire lens system is 0.916 mm, and the focal length f3 of the third lens 30 is 3.268 mm. Therefore, the ratio (f3/f0) is 3.566, which satisfies the conditional expression (5).

More specifically, the focal length f0 of the entire lens system is 0.916 mm, and the focal length f2 of the second lens 20 is −2.060 mm. Therefore, the ratio (f2/f0) is −2.248, which satisfies the conditional expression (6).

More specifically, the focal length f0 of the entire lens system is 0.916 mm, and the focal length f4 of the fourth lens 40 is 2.719 mm. Therefore, the ratio (f4/f0) is 2.968, which satisfies the conditional expression (7).

More specifically, the focal length f0 of the entire lens system is 0.916 mm, and the composite focal length f456 of the fourth lens 40, the fifth lens 50, and the sixth lens 60 is 2.738 mm. Therefore, the ratio (f456/f0) is 2.988, which satisfies the conditional expression (8).

More specifically, the focal length f0 of the entire lens system is 0.916 mm, and the composite focal length f56 of the fifth lens 50 and the sixth lens 60 is 5.281 mm. Therefore, the ratio (f56/f0) is 5.764, which satisfies the conditional expression (9).

More specifically, the object-image distance d0 of the entire lens system is 12.500 mm, and the focal length f0 of the entire lens system is 0.916 mm. Therefore, the ratio (d0/f0) is 13.643, which satisfies the conditional expression (11).

Embodiment 6

Figure 26:
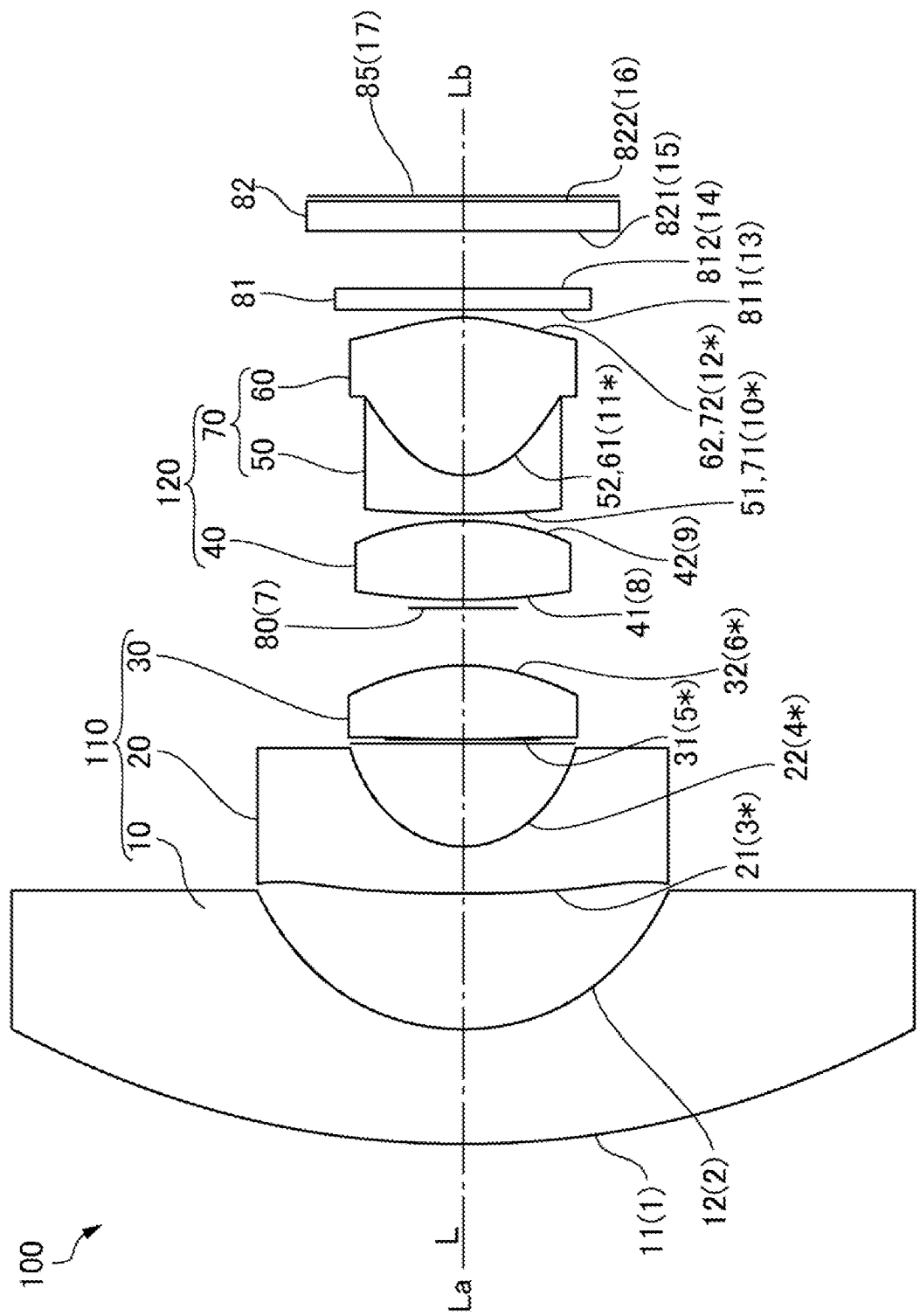
FIG. 26 is an explanatory view of a wide-angle lens according to Embodiment 6 of the present invention.
Figure 27:
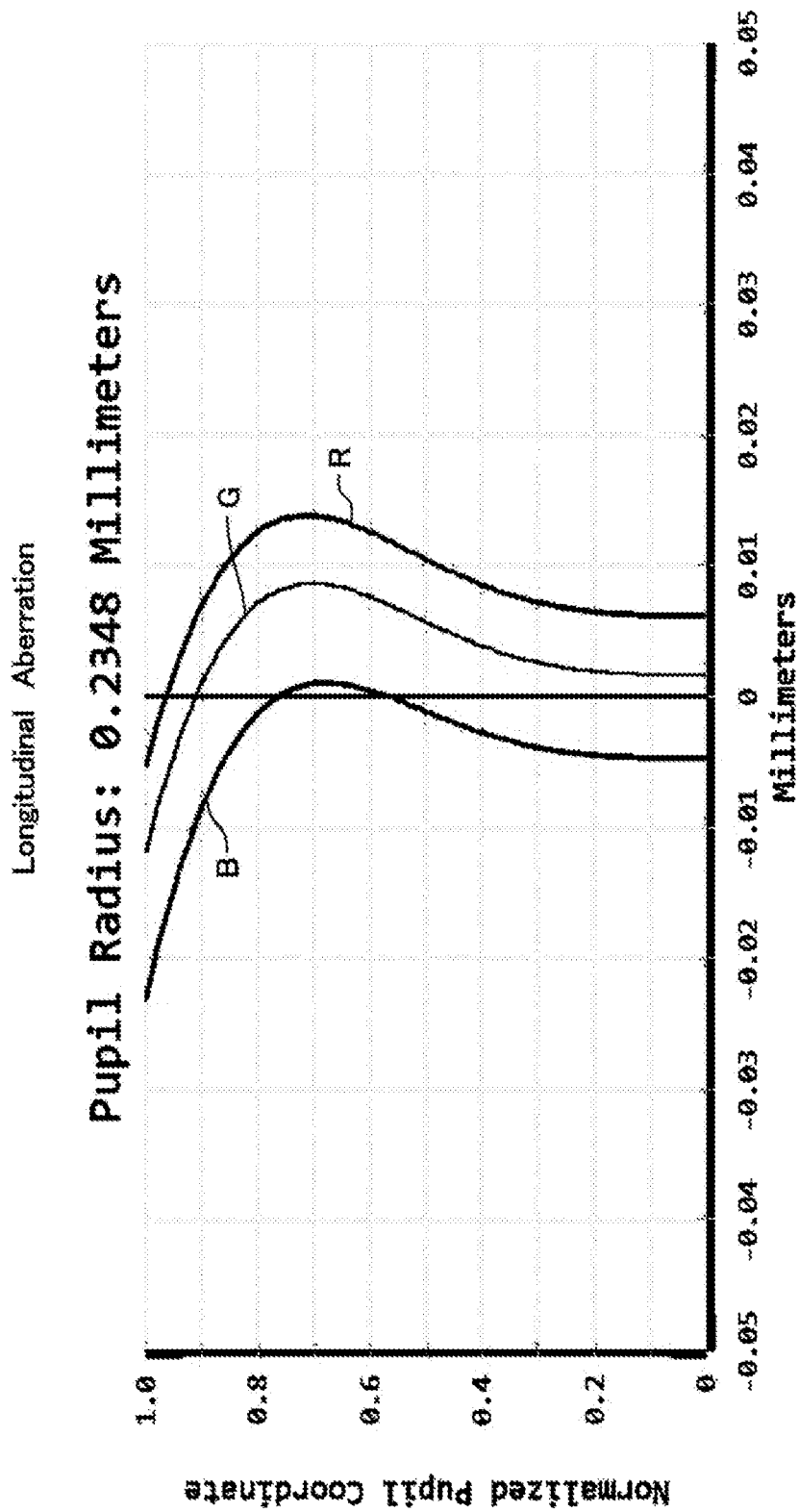
FIG. 27 is an explanatory graph showing a spherical aberration of the wide-angle lens shown in FIG. 26.
Figure 28:
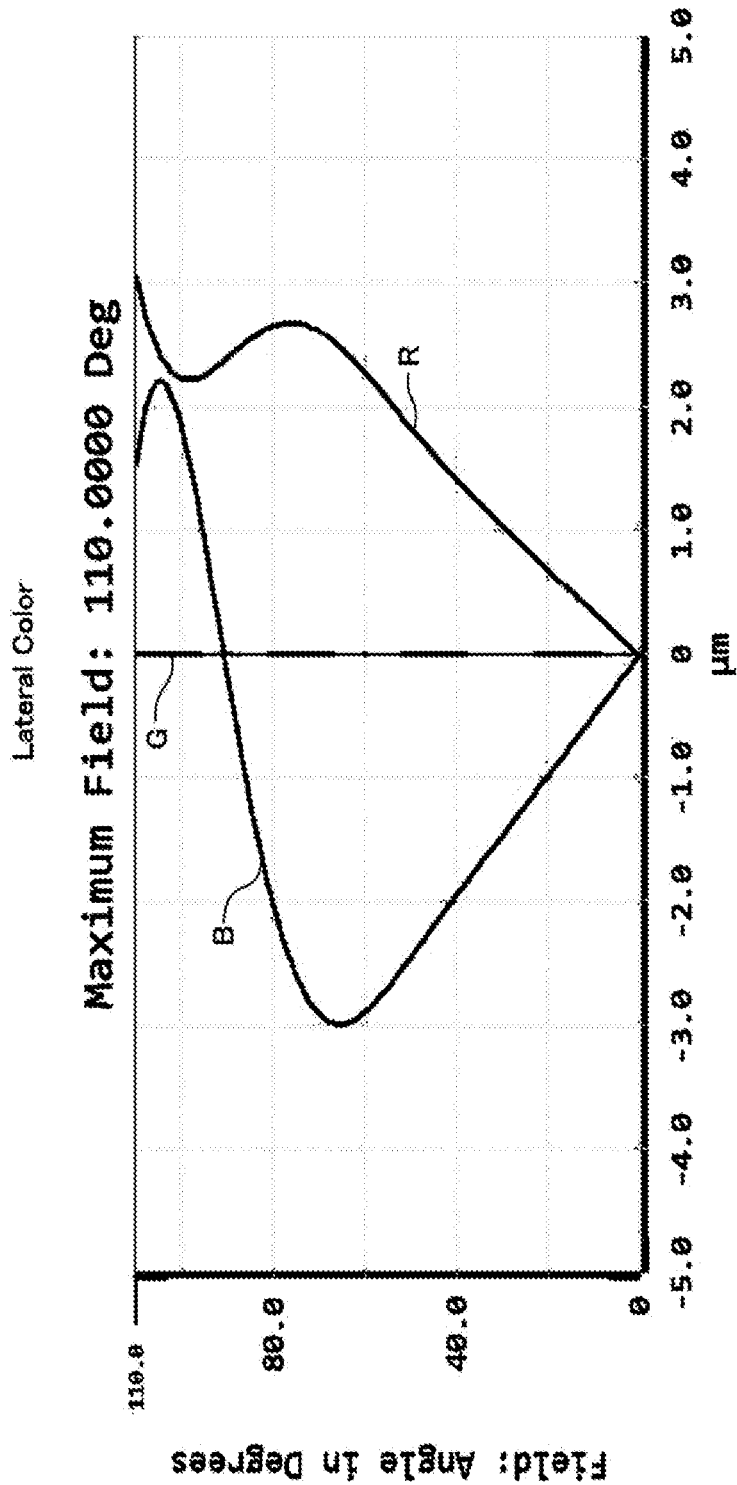
FIG. 28 is an explanatory graph showing a magnification chromatic aberration of the wide-angle lens shown in FIG. 26.
Figure 29:
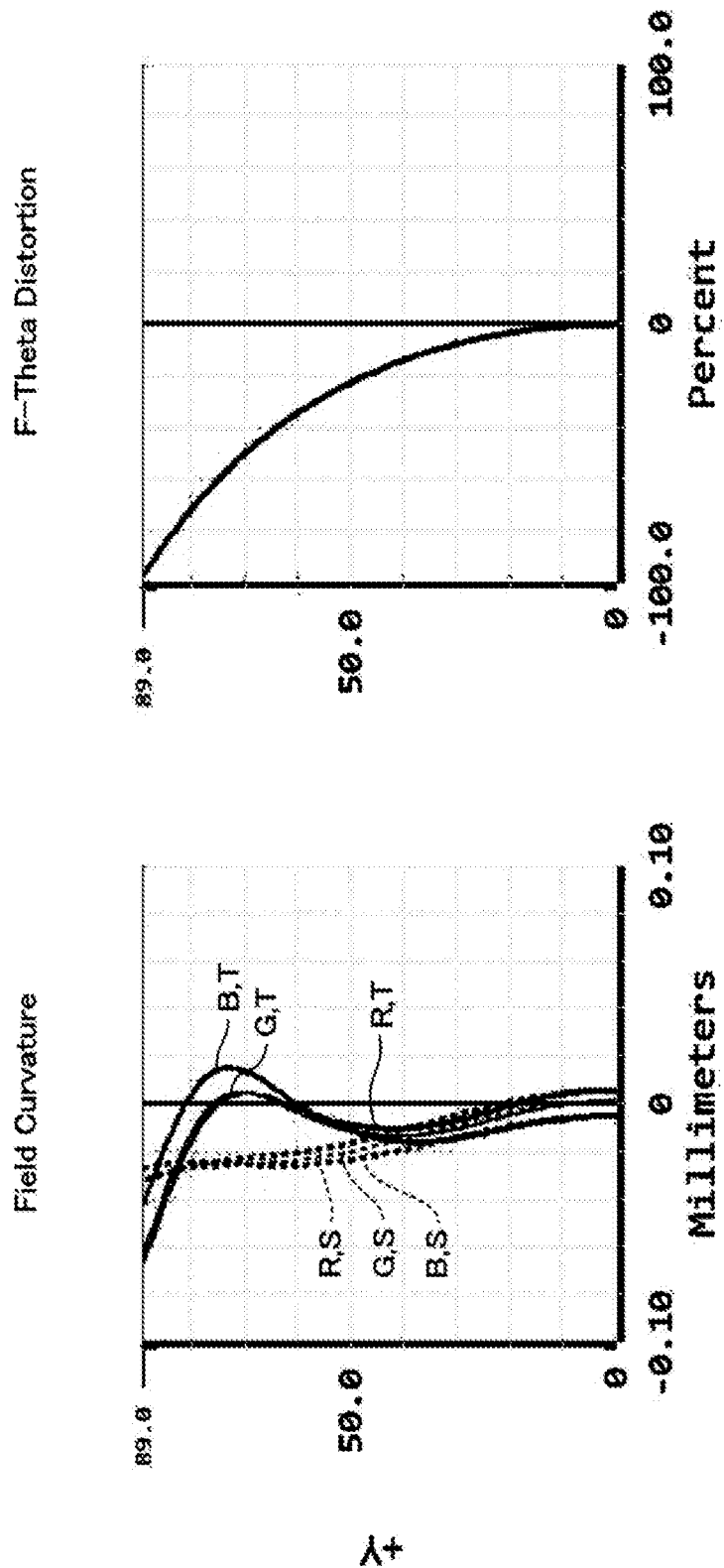
FIG. 29 is an explanatory graph showing astigmatism and distortion of the wide-angle lens shown in FIG. 26.
Figure 30:
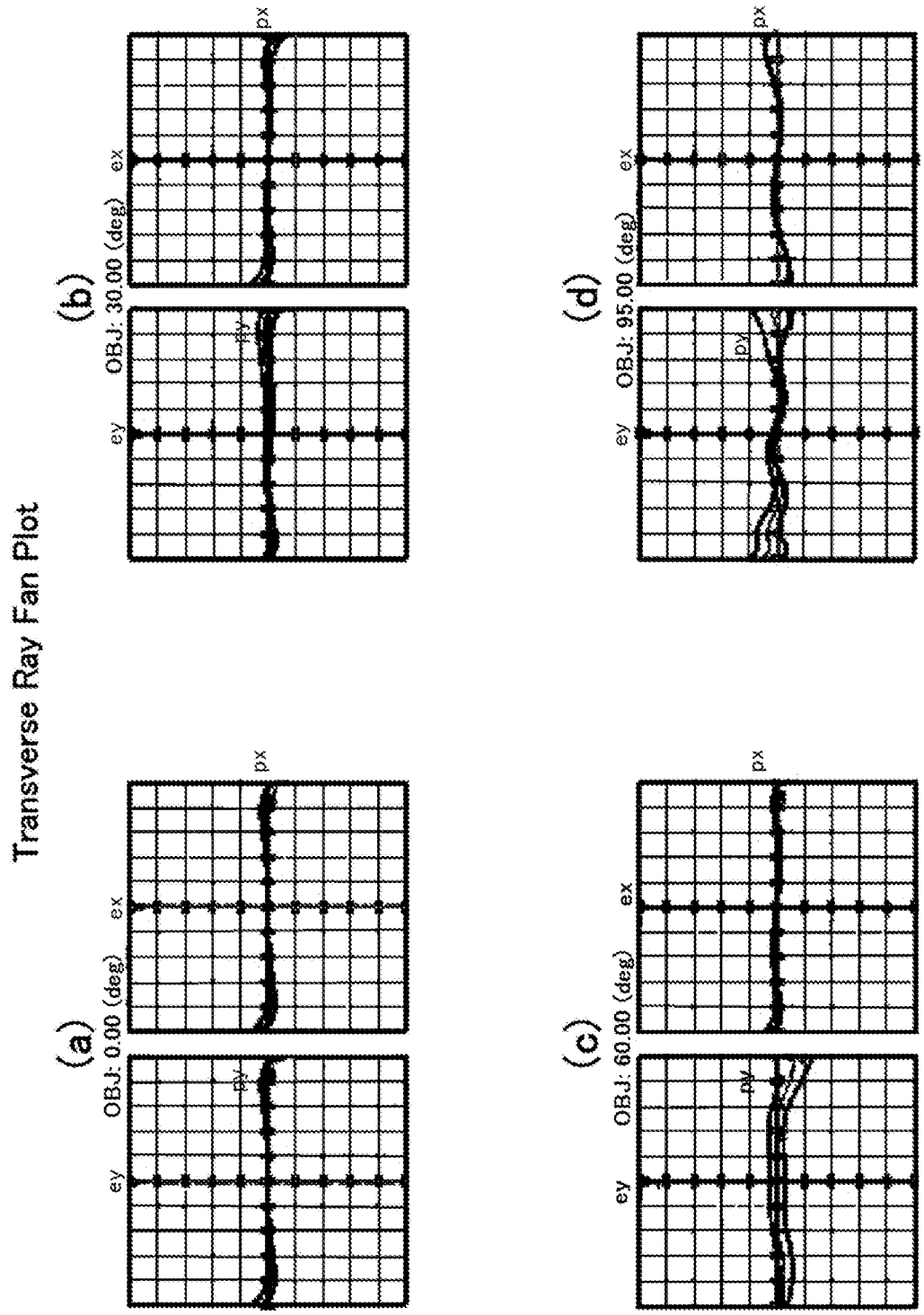
FIG. 30 is an explanatory graph showing a lateral aberration of the wide-angle lens shown in FIG. 26.

FIG. 26 is an explanatory view of the wide-angle lens 100 according to Embodiment 6 of the present invention. FIG. 27 is an explanatory graph showing a spherical aberration of the wide-angle lens 100 shown in FIG. 26. FIG. 28 is an explanatory graph showing a magnification chromatic aberration of the wide-angle lens 100 shown in FIG. 26, showing the magnification chromatic aberration at the maximum angle of view (110.000 deg/half angle). FIG. 29 is an explanatory graph showing astigmatism and distortion of the wide-angle lens 100 shown in FIG. 26. FIG. 30 is an explanatory graph showing a lateral aberration of the wide-angle lens 100 shown in FIG. 26, and FIGS. 30(a), 30(b), 30(c), and 30(d) show the lateral aberration in the tangential direction (Y direction) and the sagittal direction (X direction) at angles of 0°, 30°, 60°, and 95° formed with respect to the optical axis.

As shown in FIG. 26, similarly to Embodiment 1, the wide-angle lens 100 of this embodiment also has the front group 110, the aperture 80, the rear group 120, and the infrared cut filter 81 disposed in order from the object side La to the image side Lb. The front group 110 includes the first lens 10, the second lens 20, and the third lens 30 disposed from the most object side La to the image side Lb. The rear group 120 includes the fourth lens 40, the fifth lens 50, and the sixth lens 60 disposed from the object side La to the image side Lb. In this embodiment, the lens surface 21 (third surface 3) of the second lens 20 on the object side 1a is a concave curved surface. The other basic configurations are the same as in Embodiment 1.

Configuration and the like of each lens of the wide-angle lens 100 of this embodiment is shown in Table 7. In the wide-angle lens 100 of this embodiment, the focal length f0 of the entire lens system is 0.935 mm, the total length, which is the distance from the lens surface 11 of the first lens 10 to the imaging element 85, is 12.499 mm, the F-value of the entire lens system is 1.99, and the half angle of view is 110 deg. As shown in FIGS. 27 to 30, spherical aberration, magnification chromatic aberration, astigmatism (distortion) and lateral aberration are corrected to an appropriate level in the wide-angle lens 100 of this embodiment.

TABLE 7

| | | | | | | | | | |
|---|---|---|---|---|---|---|---|---|---|
| Effective Focal Length f0 | | | | | 0.935 mm | | | | |
| Total Track d0 | | | | | 12.499 mm | | | | |
| Image Space F/# | | | | | 1.99 | | | | |
| Half Field of Angle | | | | | 110 deg | | | | |

| Surf | Radius | Thickness | Nd | vd | Diameter | Sag | f | f | f | f |
|---|---|---|---|---|---|---|---|---|---|---|
| 1 | 12.261 | 1.508 | 1.871 | 40.5 | 11.846 | 1.526 | −4.741 | −1.272 | −15.880 | |
| 2 | 2.912 | 1.806 | | | 5.394 | 1.814 | | | | |
| 3* | −9.235 | 0.600 | 1.544 | 56.4 | 5.394 | 0.108 | −2.421 | | | |
| 4* | 1.571 | 1.392 | | | 3.006 | 1.310 | | | | |
| 5* | 32.006 | 0.998 | 1.635 | 24.2 | 3.028 | 0.053 | 4.116 | 2.255 | | 2.512 |
| 6* | −2.812 | 0.729 | | | 3.002 | −0.414 | | | | |
| 7(stop) | Infinity | 0.128 | | | | | | | | |
| 8 | 7.559 | 1.054 | 1.697 | 46.3 | 2.800 | 0.131 | 3.336 | | 2.757 | |
| 9 | −3.165 | 0.079 | | | 2.800 | −0.326 | | | | |
| 10* | 11.620 | 0.500 | 1.635 | 24.2 | 2.208 | 0.030 | −1.634 | 5.859 | | |
| 11* | 0.936 | 2.065 | 1.544 | 56.4 | 2.597 | 1.035 | 1.597 | | | |
| 12* | −2.668 | 0.100 | | | 2.975 | −0.290 | | | | |
| 13 | Infinity | 0.300 | | | | | | | | |
| 14 | Infinity | 0.770 | | | | | | | | |
| 15 | Infinity | 0.400 | | | | | | | | |
| 16 | Infinity | 0.070 | | | | | | | | |

| Surf | c (1/Radius) | K | A4 | A6 | A8 | A10 |
|---|---|---|---|---|---|---|
| 3 | −1.08284E−01 | 0.00000E+00 | 5.60907E−02 | −1.37058E−02 | 1.44741E−03 | −6.06201E−05 |
| 4 | 6.36544E−01 | −1.09582E−01 | 6.36603E−02 | 3.71655E−02 | 9.93287E−03 | −2.47329E−02 |
| 5 | 3.12440E−02 | 0.00000E+00 | −1.39725E−02 | 1.16123E−02 | −4.75614E−03 | −2.29056E−03 |
| 6 | −3.55667E−01 | 0.00000E+00 | 6.84029E−03 | 1.40792E−02 | −1.97181E−02 | 8.88177E−03 |
| 10 | 8.60553E−02 | 0.00000E+00 | −1.16961E−02 | −1.16410E−02 | 2.16486E−02 | −1.65970E−02 |
| 11 | 1.06784E+00 | −7.52255E−01 | 7.04338E−02 | −9.37235E−02 | 7.09619E−02 | −2.88800E−02 |
| 12 | −3.74788E−01 | −3.43454E−01 | 3.09007E−02 | −1.67752E−02 | 2.19789E−02 | −1.14855E−02 |

As shown in Table 2, the wide-angle lens 100 of this embodiment satisfies the conditional expressions (1), (2), (3), (5), (6), (7), (8), (9), (10), and (11) described in Embodiment 1, and thus has the same effect as Embodiment 1.

More specifically, the central thickness T1 in the optical axis direction of the first lens 10 is 1.508 mm, and the focal length f0 of the entire lens system is 0.935 mm. Therefore, the ratio (T1/f0) is 1.614, which satisfies the conditional expression (1) and the conditional expression (1a).

More specifically, Sag31 is 0.053 mm and D31 is 3.028 mm. Therefore, the absolute value of the ratio (Sag31/(D31/2)) is 0.035, which satisfies the conditional expression (2).

More specifically, the focal length f0 of the entire lens system is 0.935 mm, and the focal length f1 of the first lens 10 is −4.741 mm. Therefore, the ratio (MO) is −5.074, which satisfies the conditional expression (3).

More specifically, the focal length f0 of the entire lens system is 0.935 mm, and the focal length f3 of the third lens 30 is 4.116 mm. Therefore, the ratio (f3/f0) is 4.405, which satisfies the conditional expression (5).

More specifically, the focal length f0 of the entire lens system is 0.935 mm, and the focal length f2 of the second lens 20 is −2.421 mm. Therefore, the ratio (f2/f0) is −2.591, which satisfies the conditional expression (6).

More specifically, the focal length f0 of the entire lens system is 0.935 mm, and the focal length f4 of the fourth lens 40 is 3.336 mm. Therefore, the ratio (f4/f0) is 3.570, which satisfies the conditional expression (7).

More specifically, the focal length f0 of the entire lens system is 0.935 mm, and the composite focal length f456 of the fourth lens 40, the fifth lens 50, and the sixth lens 60 is 2.757 mm. Therefore, the ratio (f456/f0) is 2.951, which satisfies the conditional expression (8).

More specifically, the focal length f0 of the entire lens system is 0.935 mm, and the composite focal length f56 of the fifth lens 50 and the sixth lens 60 is 5.859 mm. Therefore, the ratio (f56/f0) is 6.270, which satisfies the conditional expression (9).

More specifically, the focal length f0 of the entire lens system is 0.935 mm, and the radius of curvature R42 on the optical axis of the lens surface 42 on the image side Lb of the fourth lens 40 is −3.165 mm. Therefore, the ratio (R42/f0) is −3.387, which satisfies the conditional expression (10).

More specifically, the object-image distance d0 of the entire lens system is 12.499 mm, and the focal length f0 of the entire lens system is 0.935 mm. Therefore, the ratio (d0/f0) is 13.375, which satisfies the conditional expression (11).

Other Embodiments

In the above embodiment, the first lens 10 is a glass lens, but it may also be a plastic lens. In this case, the lens surface 102 on the image side Lb of the first lens 10 can be made aspherical.

The invention claimed is:

1. A wide-angle lens, characterized in that
in order from an object side to an image side, a front group, an aperture, and a rear group are disposed;
a first lens disposed on a most object side in the front group is a negative meniscus lens whose lens surface on the image side is a concave curved surface; and
assuming that a central thickness in an optical axis direction of the first lens is T1 (mm) and a focal length of an entire lens system is f0 (mm), a conditional expression below:

$$1.500 \leq T1/f0 \leq 1.850$$

is satisfied,
wherein
in the front group, the first lens, a second lens, and a third lens are disposed in order from the most object side to the image side;
in the rear group, a fourth lens, a fifth lens, and a sixth lens are disposed in order from the most object side to the image side;
the second lens is a negative lens in which an image-side lens surface is a concave curved surface;
the third lens is a biconvex lens in which both an object-side lens surface and an image-side lens surface are convex curved surfaces;
the fourth lens is a biconvex lens in which both an object-side lens surface and an image-side lens surface are convex curved surfaces;
the fifth lens is a negative lens in which an image-side lens surface is a concave curved surface;
the sixth lens is a biconvex lens in which both an object-side lens surface and an image-side lens surface are convex curved surfaces; and
the fifth lens and the sixth lens are a cemented lens in which the image-side lens surface of the fifth lens and the object-side lens surface of the sixth lens are cemented.

2. The wide-angle lens according to claim 1, wherein assuming that a sag amount of the object-side lens surface of the third lens is Sag31 (mm) and a diameter of the object-side lens surface of the third lens is D31 (mm), a conditional expression below:

$$0 < |Sag31/(D31/2)| < 0.060$$

is satisfied by the sag amount Sag31 and the diameter D31.

3. The wide-angle lens according to claim 1, wherein assuming that a focal length of the first lens is f1 (mm) and a focal length of the second lens is f2 (mm), a conditional expression below:

$$2.000 < f1/f2 < 2.400$$

is satisfied.

4. The wide-angle lens according to claim 1, wherein assuming that the focal length of the entire lens system is f0 (mm) and a focal length of the third lens is f3 (mm), a conditional expression below:

$$3.500 < f3/f0 < 5.000$$

is satisfied.

5. The wide-angle lens according to claim 1, wherein assuming that the focal length of the entire lens system is f0 (mm) and a focal length of the second lens is f2 (mm), a conditional expression below:

$$-2.800 < f2/f0 < -2.100$$

is satisfied.

6. The wide-angle lens according to claim 1, wherein assuming that the focal length of the entire lens system is f0 (mm) and a focal length of the fourth lens is f4 (mm), a conditional expression below:

$$2.800 < f4/f0 < 4.000$$

is satisfied.

7. The wide-angle lens according to claim 1, wherein assuming that the focal length of the entire lens system is f0 (mm) and a composite focal length of the fourth lens, the fifth lens and the sixth lens is f456 (mm), a conditional expression below:

$$2.000 < f456/f0 < 3.000$$

is satisfied.

8. The wide-angle lens according to claim 1, wherein assuming that the focal length of the entire lens system is f0 (mm) and a composite focal length of the fifth lens and the sixth lens is f56 (mm), a conditional expression below:

$$5.000 < f56/f0 < 7.000$$

is satisfied.

9. The wide-angle lens according to claim 1, wherein assuming that the focal length of the entire lens system is f0 (mm) and a radius of curvature on an optical axis of the image-side lens surface of the fourth lens is R42, a conditional expression below:

$$-5.000 < R42/f0 < -2.800$$

is satisfied.

10. The wide-angle lens according to claim 1, wherein assuming that an object-image distance of the entire lens system is d0 and the focal length of the entire lens system is f0, a conditional expression below:

$$10.000 < d0/f0 < 18.000$$

is satisfied.

11. The wide-angle lens according to claim 1, wherein assuming that the focal length of the entire lens system is f0 (mm) and a focal length of the first lens is f1 (mm), a conditional expression below:

$$-6.000 < f1/f0 < -4.500$$

is satisfied.

* * * * *